United States Patent
Hahm et al.

(10) Patent No.: US 11,783,693 B2
(45) Date of Patent: Oct. 10, 2023

(54) HOME APPLIANCE CONTROLLING OUTPUT OF INFORMATION TO A USER TERMINAL AND CONTROL METHOD THEREOF

(71) Applicant: SAMSUNG ELECTRONICS CO., LTD., Suwon-si (KR)

(72) Inventors: Seongil Hahm, Suwon-si (KR); Taejun Kwon, Suwon-si (KR); Sungkyu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 17/512,313

(22) Filed: Oct. 27, 2021

(65) Prior Publication Data

US 2022/0327909 A1   Oct. 13, 2022

Related U.S. Application Data

(63) Continuation of application No. PCT/KR2021/013740, filed on Oct. 7, 2021.

(30) Foreign Application Priority Data

Apr. 12, 2021 (KR) .................. 10-2021-0047269

(51) Int. Cl.
  *G08B 21/22*   (2006.01)
  *G08B 21/18*   (2006.01)
  *H04W 4/80*    (2018.01)

(52) U.S. Cl.
  CPC ........... *G08B 21/22* (2013.01); *G08B 21/182* (2013.01); *H04W 4/80* (2018.02)

(58) Field of Classification Search
  CPC ........ G08B 21/22; G08B 21/182; H04W 4/80
  See application file for complete search history.

(56) References Cited

U.S. PATENT DOCUMENTS 9,374,424 B2   6/2016  Cheong et al.
10,438,525 B2  10/2019  Yeon et al.
(Continued)

FOREIGN PATENT DOCUMENTS

CN   114584412   * 11/2020   ............. G16Y 40/30
KR   2003-0083968 A   11/2003
(Continued)

OTHER PUBLICATIONS

"Push Notifications Statistics (2021)," Business of Apps, https://www.businessofapps.com/marketplace/push-notifications/research/pushnotifications-statistics/?source=post_page#3, Last Updated Aug. 31, 2021, Total 25 pages.
(Continued)

*Primary Examiner* — Hongmin Fan
(74) *Attorney, Agent, or Firm* — Sughrue Mion, PLLC

(57) ABSTRACT

An appliance is provided. The appliance includes a memory storing content, a communication interface, an outputter, and a processor configured to, based on identifying a predetermined event, control the outputter to output the content stored in the memory, and store first time information corresponding to an occurrence time of the predetermined event in the memory, transmit, to a user terminal through the communication interface, a first control signal requesting second time information corresponding to a time when a user was detected at the user terminal, receive the second time information from the user terminal, based on a difference between the first time information and the second time information being less than a threshold time, control the communication interface to transmit a second control signal that provides information corresponding to the content to the user terminal.

20 Claims, 20 Drawing Sheets

(56) References Cited

U.S. PATENT DOCUMENTS

| | | | |
|---|---|---|---|
| 2013/0117784 A1 | 5/2013 | Wu et al. |
| 2014/0081433 A1 | 3/2014 | Cheong et al. |
| 2016/0078795 A1 | 3/2016 | Yeon et al. |
| 2016/0092066 A1 | 3/2016 | Jeon |
| 2020/0219514 A1 | 7/2020 | Boo |
| 2021/0048242 A1 | 2/2021 | Kim et al. |
| 2022/0050590 A1 | 2/2022 | Hong et al. |

FOREIGN PATENT DOCUMENTS

| | | | |
|---|---|---|---|
| KR | 10-2013-0050868 A | 5/2013 |
| KR | 10-2014-0038238 A | 3/2014 |
| KR | 10-2016-0031196 A | 3/2016 |
| KR | 10-2016-0140347 A | 12/2016 |
| KR | 10-1770240 B1 | 8/2017 |
| KR | 10-2019-0119966 A | 10/2019 |
| KR | 10-2020-0084584 A | 7/2020 |
| KR | 10-2020-0085593 A | 7/2020 |

OTHER PUBLICATIONS

Emily Bonnie, "2018 Report: Data-Backed Secrets of Winning Push Notification Campaigns," https://clevertap.com/blog/2018-push-notification-report/, 2018, Total 6 pages.

Tapjoy, "7 Surprising Facts About The Open Rates of Push Notifications," https://www.tapjoy.com/resources/7-surprising-facts-about-the-open-rates-ofpush-notifications/, Feb. 22, 2017, Total 6 pages.

Aykut Bal, "90 Percent of Push Notifications are Opened [5+infographics]," https://storyly.io/90-percent-of-push-notifications-are-opened-5-infographics/#How%20to%20use%20push-notifications%20effectively, May 7, 2020, Total 9 pages.

International Search Report (PCT/ISA/210) dated Jan. 28, 2022 by the International Searching Authority in International Application No. PCT/KR2021/013740.

Written Opinion (PCT/ISA/237) dated Jan. 28, 2022 by the International Searching Authority in International Application No. PCT/KR2021/013740.

* cited by examiner

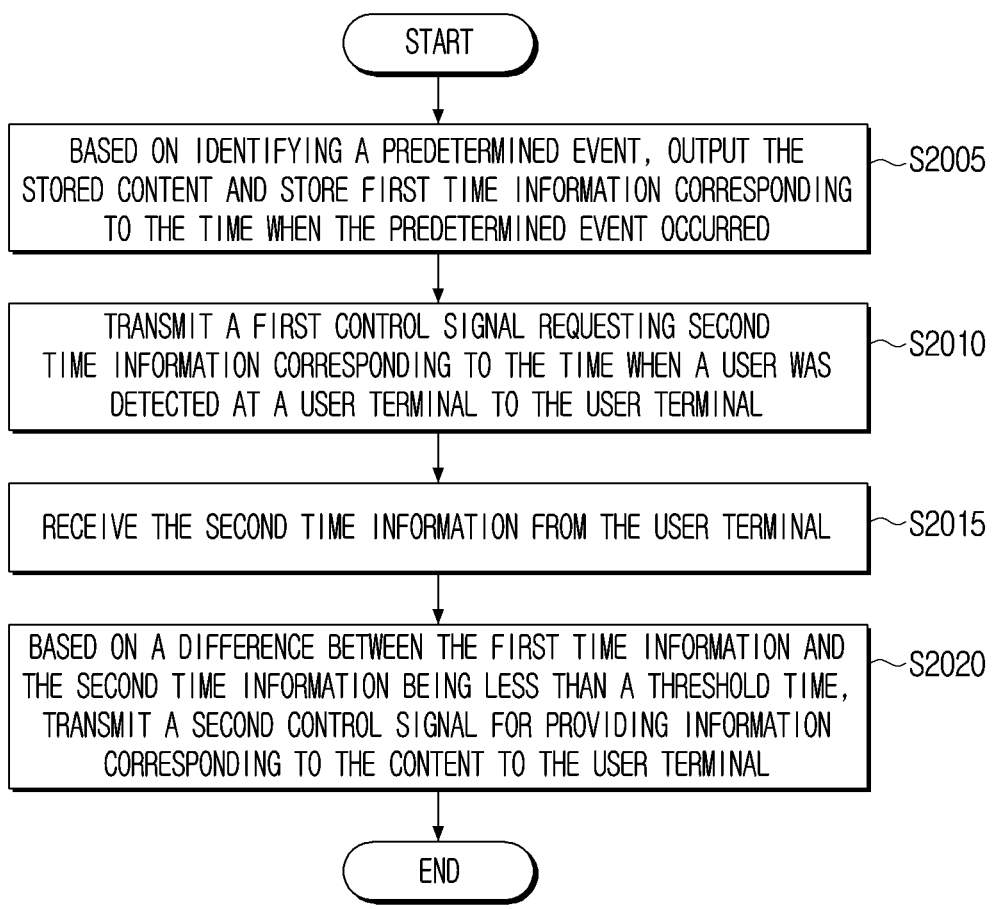

HOME APPLIANCE CONTROLLING OUTPUT OF INFORMATION TO A USER TERMINAL AND CONTROL METHOD THEREOF

CROSS-REFERENCE TO RELATED APPLICATIONS

This application is a continuation of International Application No. PCT/KR2021/013740 designating the United States, filed on Oct. 7, 2021, in the Korean Intellectual Property Receiving Office and claiming priority to Korean Patent Application No. 10-2021-0047269, filed on Apr. 12, 2021, in the Korean Intellectual Property Office, the disclosures of which are incorporated by reference herein in their entireties.

BACKGROUND

1. Field

The disclosure relates to a home appliance and a controlling method thereof, and more particularly, to a home appliance that provides a detailed content to a user terminal through a home appliance, and a controlling method thereof.

2. Description of Related Art

Smart home appliances can provide various information to users. For example, a home appliance can directly acquire information and recommend an appropriate operation mode. Also, services may be performed, such as a home appliance inducing purchase of a consumable or recommending food ingredients or a recipe, etc.

A home appliance may transfer information to a user through a display or a speaker. However, when a display of a home appliance is small (or a resolution is low), or information is provided to a user only through a speaker, it may be difficult to provide a large amount of information to the user.

For resolving this, a home appliance may display detailed content on a terminal device of a user. If a home appliance transmits a specific signal, a notification message may be displayed on a terminal device, and only when a user selects the notification message, a large amount of information may be displayed on the terminal device.

However, if notification messages continue being displayed on a terminal device of a user, the user may feel a sense of fatigue for the notification messages, and a problem that the user does not use the function at all may occur.

SUMMARY

Provided is home appliance that outputs detailed information at a user terminal only in case a user was detected at the user terminal within a threshold time after a predetermined event occurred at the home appliance, and a controlling method thereof.

Technical Solution

Additional aspects will be set forth in part in the description which follows and, in part, will be apparent from the description, or may be learned by practice of the presented embodiments.

In accordance with an aspect of the disclosure, an appliance is provided. The appliance may include a memory storing content, a communication interface, an outputter, and a processor configured to, based on identifying a predetermined event, control the outputter to output the content stored in the memory, and store first time information corresponding to an occurrence time of the predetermined event in the memory, transmit, to a user terminal through the communication interface, a first control signal requesting second time information corresponding to a time when a user was detected at the user terminal, receive the second time information from the user terminal, based on a difference between the first time information and the second time information being less than a threshold time, control the communication interface to transmit a second control signal that provides information corresponding to the content to the user terminal.

The predetermined event may include at least one of an event where the appliance is manipulated by the user, an event where the user is detected, or an event where a predetermined time occurs, and the second time information may include at least one of third time information corresponding to a time when a manipulation of the user terminal was detected, fourth time information corresponding to a time when a movement of the user terminal was detected, or fifth time information corresponding to a time when the user was detected at the user terminal.

The processor may the communication interface to broadcast the first control signal, and receive the second time information corresponding to the first control signal from the user terminal through the communication interface.

The processor may control the communication interface such that the first control signal is broadcasted by a Bluetooth Low Energy (BLE) method.

The outputter may include a display, and the processor may, based on identifying the predetermined event, control the display to display a first user interface (UI) that guides transmission of the first control signal, and based on receiving a first user input through the displayed first UI, control the communication interface to transmit the first control signal to the user terminal.

The outputter may include a display, and the processor may, based on the difference between the first time information and the second time information being less than the threshold time, control the display to display a second UI that guides transmission of the second control signal, and based on receiving a second user input through the displayed second UI, control the communication interface to transmit the second control signal to the user terminal.

The second control signal may include at least one of the information corresponding to the content, a control command for providing the information corresponding to the content, or information on an application for providing the information corresponding to the content, and the information corresponding to the content comprises a uniform resource locator (URL) address related to the content.

The control command for providing the information corresponding to the content may include at least one of a control command for displaying the information corresponding to the content on a display of the user terminal, a control command for displaying a notification message for providing the information corresponding to the content on the display of the user terminal, or a control command for outputting the information corresponding to the content through a speaker of the user terminal.

The processor may, based on the difference between the first time information and the second time information being equal to or greater than the threshold time, re-transmit the first control signal for re-requesting the second time information corresponding to the time when the user was detected at the user terminal to the user terminal through the communication interface, and output a third UI that guides a manipulation of the user terminal through the outputter.

The processor may, based on the difference between the first time information and the second time information being equal to or greater than the threshold time, identify whether the information corresponding to the content can be output through the outputter, and based on identifying that the information corresponding to the content can be output through the outputter, control the outputter to output the information corresponding to the content, or based on identifying that the information corresponding to the content cannot be output through the outputter, control the outputter to output a notification message notifying that the information corresponding to the content cannot be output.

According to an aspect of the disclosure, a controlling method of an appliance storing content is provided. The controlling method may include based on identifying a predetermined event, outputting the stored content, and storing first time information corresponding to an occurrence time of the predetermined event, transmitting, to a user terminal, a first control signal requesting second time information corresponding to a time when a user was detected at the user terminal, receiving the second time information from the user terminal, and based on a difference between the first time information and the second time information being less than a threshold time, transmitting a second control signal for providing information corresponding to the content to the user terminal.

The predetermined event may include at least one of an event where the appliance is manipulated by the user, an event where the user is detected, or an event where a predetermined time occurs, and the second time information may include at least one of third time information corresponding to a time when a manipulation of the user terminal was detected, fourth time information corresponding to a time when a movement of the user terminal was detected, or fifth time information corresponding to a time when the user was detected at the user terminal.

In the step of transmitting the first control signal, the first control signal may be broadcasted, and in the step of receiving the second time information, the second time information corresponding to the first control signal may be received from the user terminal.

In the step of transmitting the first control signal, the first control signal may be broadcasted by a BLE method.

The controlling method may further include the steps of, based on identifying the predetermined event, displaying a first UI that guides transmission of the first control signal, and based on receiving a first user input through the displayed first UI, transmitting the first control signal to the user terminal.

Meanwhile, the controlling method may further include the steps of, based on the difference between the first time information and the second time information being smaller than the threshold time, displaying a second UI for guiding transmission of the second control signal, and based on receiving a second user input through the displayed second UI, transmitting the second control signal to the user terminal.

Meanwhile, the second control signal may include at least one of the detailed information, a control command for providing the detailed information, or information on an application for providing the detailed information, and the detailed information may include a uniform resource locator (URL) address related to the content.

Meanwhile, the control command for providing the detailed information may include at least one of a control command for displaying the detailed information on a display of the user terminal, a control command for displaying a notification message for providing the detailed information on the display of the user terminal, or a control command for outputting the detailed information through a speaker of the user terminal.

Meanwhile, the controlling method may further include the steps of, based on the difference between the first time information and the second time information being equal to or greater than the threshold time, re-transmitting the first control signal for re-requesting the second time information corresponding to the time when the user was detected at the user terminal to the user terminal, and outputting a third UI for guiding a manipulation of the user terminal.

Meanwhile, the controlling method may further include the steps of, based on the difference between the first time information and the second time information being equal to or greater than the threshold time, identifying whether the detailed information can be output through the outputter of the home appliance, and based on identifying that the detailed information can be output through the outputter, outputting the detailed information, and based on identifying that the detailed information cannot be output through the outputter, outputting a notification message notifying that the detailed information cannot be output.

In accordance with an aspect of the disclosure, an appliance is provided. The appliance may include an output device, a memory storing content, and a processor configured to output, by the output device and in response to identifying a predetermined event, the content stored on the memory, store, in the memory and in response to identifying the predetermined event, first time information corresponding to a time of the predetermined event, receive, from a user terminal, second time information corresponding to a time when a user was detected at the user terminal, and transmit, to the user terminal, information corresponding to the content based on a difference between the first time information and the second time information being less than a threshold time.

The predetermined event may include the appliance being manipulated by the user, the user being detected, or a predetermined time occurring.

The processor may be further configured to, in response to identifying the predetermined event, display, on the output device, a first UI that includes a selection for requesting the second time information.

The processor may be further configured to, based on the difference between the first time information and the second time information being equal to or greater than the threshold time, output the information corresponding to the content on the output device.

The processor may be further configured to, based on the difference between the first time information and the second time information being equal to or greater than the threshold time, and based on determining that the information corresponding to the content cannot be output on the output device, output a notification that indicates to the user that the information correspond to the content cannot be output through the output device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 20 is a flowchart of a controlling method of a home appliance according to an embodiment.

DETAILED DESCRIPTION

Figure 1:
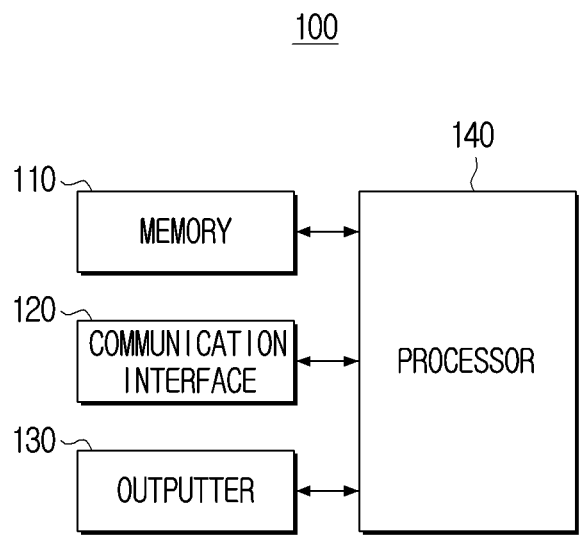
FIG. 1 is a block diagram illustrating a home appliance according to an embodiment.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may describe various elements regardless of any order and/or degree of importance. Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In addition, singular expressions include plural expressions, as long as they do not obviously mean differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or "parts" may be integrated into at least one module and implemented as at least one processor (not shown), except "modules" or "parts" which need to be implemented as specific hardware.

In addition, in this specification, the term "user" may refer to a person who uses a home appliance or a device using a home appliance (e.g.: an artificial intelligence home appliance).

Hereinafter, an embodiment of the disclosure will be described in more detail with reference to the accompanying drawings.

FIG. 1 is a block diagram illustrating a home appliance according to an embodiment.

Referring to FIG. 1, a home appliance 100 may include a memory 110, a communication interface 120, an outputter 130, and a processor 140.

The home appliance 100 may be a smart home appliance, and it may be a device that provides a specific content to a user.

The home appliance 100 may include, for example, at least one of a television, a digital video disk (DVD) player, an audio, a refrigerator, an air conditioner, a cleaner, an oven, a microwave oven, a washing machine, an air cleaner, a set-top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, or an electronic photo frame.

Also, in some embodiments, the home appliance 100 may include, for example, at least one of a smartphone, a tablet personal computer (PC), a mobile phone, a video phone, an e-book reader, a desktop PC, a laptop PC, a netbook computer, a workstation, a server, a PDA, a portable multimedia player (PMP), an MP3 player, a medical device, a camera, or a wearable device. Further, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or a bio-implantable circuit.

The memory 110 may be implemented as an internal memory such as a read-only memory (ROM) (e.g., an electrically erasable programmable read-only memory (EEPROM)), a random access memory (RAM), etc., included in the processor 140, or implemented as a separate memory from the processor 140. In this case, according to the use of stored data, the memory 110 may be implemented in the form of a memory embedded in the home appliance 100, or in the form of a memory that can be attached to and detached from the home appliance 100. For example, in the case of data for driving the home appliance 100, the data may be stored in a memory embedded in the home appliance 100, and in the case of data for an extended function of the home appliance 100, the data may be stored in a memory that can be attached to and detached from the home appliance 100.

In the case of a memory embedded in the home appliance 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an EEPROM, a mask ROM, a flash ROM, a flash memory (e.g.: NAND flash or NOR flash, etc.), a hard drive, or a solid state drive (SSD)). In the case of a memory that can be attached to and detached from the home appliance 100, the memory may be implemented in a form such as a memory card (e.g.: compact flash (CF), secure digital (SD), micro secure digital (Micro-SD), mini secure digital (Mini-SD), extreme digital (xD), a multi-media card (MMC), etc.), an external memory that can be connected to a universal serial bus (USB) port (e.g., a USB memory), etc.

The memory 110 may store a content. A content may refer to a content provided to a user. A content may include at least one of an advertising content, a device content, or a user content. An advertising content may refer to a content for advertising a specific subject to a user. For example, an advertising content may refer to a content for advertising a new home appliance product. A device content may refer to a content that provides information related to the home appliance 100. For example, a device content may refer to a content for providing the current state information of the home appliance 100. A user content may refer to a content stored by a user or requested by a user. For example, a user content may be a content that explains a purchasing process of a refrigerator filter corresponding to a user input for purchasing a refrigerator filter.

A content may be an audio content, an image content, or a video content. It was described that a content is stored in the memory 110, but depending on actual implementation examples, the home appliance 100 may receive a content through an external server, and store the content received through the external server in the memory 110.

In case the content includes an image, the content may be a UI provided to a user. For example, the content may be a UI providing information related to a new home appliance product to a user.

The communication interface 120 is a component that performs communication with various types of external devices according to various types of communication methods. The communication interface 120 includes a Wi-Fi module, a Bluetooth module, an infrared communication module, a wireless communication module, etc. Each communication module may be implemented in a form of at least one hardware chip.

A Wi-Fi module and a Bluetooth module may perform communication by using a Wi-Fi method and a Bluetooth method, respectively. In the case of using a Wi-Fi module or a Bluetooth module, various types of connection information such as a service set identifier (SSID) and a session key is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the communication methods.

Other than the above, the communication interface 120 may include at least one of a local area network (LAN) module, an Ethernet module, or a wired communication module that performs communication by using a pair cable, a coaxial cable, an optical fiber cable, or an ultra wide-band (UWB) module, etc.

The outputter 130 may refer to a component that outputs data. The outputter 130 may include at least one of a display 131 or a speaker 132. For example, an operation of outputting data may refer to at least one operation between an operation of displaying data through a display or an operation of outputting data through a speaker.

The processor 140 may perform overall controlling operations of the home appliance 100. The processor 140 performs a function of controlling overall operations of the home appliance 100.

The processor 140 may be implemented as a digital signal processor (DSP) processing digital signals, a microprocessor, and a time controller (TCON). However, the disclosure is not limited thereto, and the processor 140 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA). Further, the processor 140 may perform various functions by executing computer executable instructions stored in the memory.

If a predetermined event is identified, the processor 140 may control the outputter 130 to output a content stored in the memory 110 and store first time information corresponding to the occurrence time of the predetermined event in the memory 110, and transmit a first control signal for requesting second time information corresponding to a time when a user was detected at a user terminal to the user terminal through the communication interface 120. Then, if a difference between the first time information and the second time information is less than a threshold time, the processor 140 may control the communication interface 120 to transmit a second control signal for providing detailed information corresponding to the content to the user terminal.

The user terminal may be described as a user terminal device, a user terminal apparatus, an external device, etc. The user terminal may refer to various portable devices that a user is carrying. For example, the user terminal may refer to a smartphone, a tablet, a wearable device, etc.

A predetermined event may refer to at least one of an advertisement provision event that provides an advertisement at any time (or a predetermined time) at the home appliance, a notification event related to the home appliance, a home appliance manipulation event, a user detection event, or an event of requesting detailed information by a user.

An advertisement provision event may refer to an event of providing an advertisement to a user through the outputter 130 of the home appliance. An advertisement provision event may be an event that occurs at any time or a predetermined time. For example, an advertisement may be output through the outputter 130 of the home appliance 100 at 7 p.m. every day. When it becomes 7 p.m. every day, the home appliance 100 may identify that an advertisement provision event has occurred.

A notification event related to the home appliance may be an event for providing information of the home appliance. A notification event related to the home appliance may be an event where at least one of the current operation state information, the breakage information, or the component replacement information of the home appliance is output. For example, a notification event may be an event where a current setting temperature and an internal temperature of a refrigerator are output, an event where information that a motor broke down in a refrigerator is output, or an event where information guiding replacement of an odor filter of a refrigerator is output.

A home appliance manipulation event may be an event where the home appliance 100 is manipulated by a user. A home appliance manipulation event may refer to an event where a user input is received through a manipulation interface 150 included in the home appliance 100. For example, a home appliance manipulation event may refer to an event where opening of a door of a refrigerator is recognized or an event where a touch input of a display of a refrigerator is received.

A user detection event may refer to an event where it is identified that a user exists around the home appliance 100. The home appliance 100 may identify whether a user exists around the home appliance 100 by using a camera (e.g., 170 of FIG. 2) or a sensor (e.g., an infrared sensor or a heat detection sensor, etc.). Then, if it is identified that a user exists around the home appliance 100, the home appliance 100 may determine that a user detection event occurred. For example, a user detection event may be an event where it is identified that a user exists within a distance of 1 m from a refrigerator.

An event of requesting detailed information by a user may be an event where a user directly requests detailed information related to a specific content. For example, an event of requesting detailed information by a user may be an event where a user input requesting detailed information of a pizza recipe displayed on a refrigerator is input.

The processor 140 may identify whether a predetermined event occurred. If it is identified that a predetermined event occurred, the processor 140 may control the outputter 130 to output a content stored in the memory 110. Also, if it is identified that a predetermined event occurred, the processor 140 may acquire the occurrence time of the predetermined event. Then, the processor 140 may store the occurrence time of the predetermined event as the first time information in the memory 110.

According to an embodiment of the disclosure, time information may be implemented as an absolute time (e.g., a standard time). For example, if it is identified that a door of a refrigerator was opened, the refrigerator may store the time when the refrigerator was opened, 13:50:05 p.m., as the first time information.

According to a different implementation example, time information may be implemented based on a time when a first control signal was transmitted. For example, if it is identified that a door of a refrigerator was opened, the refrigerator may transmit a first control signal for detecting a user at a user terminal, and store the time point when the first control signal was transmitted, '0 second' (the standard time point), as the first time information. Also, a difference between the first time information and the second time information that will be described below may refer to the time that passed from the standard time point.

Then, the processor 140 may request the time when a user was detected at the user terminal 200 to the user terminal 200. The processor 140 may control the communication interface 120 to transmit a second control signal for requesting second time information corresponding to the time when a user was detected at the user terminal 200 to the user terminal 200.

According to an embodiment of the disclosure, the first control signal may be broadcasted. The processor 140 may broadcast the first control signal, and transmit the first control signal without specifying a counterpart device.

According to another embodiment of the disclosure, the home appliance 100 and the user terminal 200 may be connected 1:1 for transmitting the first control signal to the user terminal 200. A communication session may be established between the home appliance 100 and the user terminal 200, and the processor 140 may control the communication interface 120 to directly transmit the first control signal to the user terminal 200 by using the established communication session. For example, the home appliance 100 and the user terminal 200 may be Bluetooth-paired.

The user terminal 200 may receive the first control signal transmitted from the home appliance 100. When the first control signal is received, the user terminal 200 may detect a user.

According to an embodiment of the disclosure, when a manipulation of the user terminal 200 is input, the user terminal 200 may determine that a user is detected. If a user input of pushing the button of the user terminal 200 or a user input of touching the touch display of the user terminal 200 is received, the user terminal 200 may determine that a user is detected.

According to another embodiment of the disclosure, the user terminal 200 may detect a user based on image data. The user terminal 200 may include a camera. The user terminal 200 may acquire image data through the camera. Then, the user terminal 200 may analyze the acquired image data and detect whether a user exists. The user terminal 200 may acquire distance information between the detected user and the user terminal 200 based on the acquired image data. Then, if the acquired distance information is within a threshold distance, the user terminal 200 may determine that a user was detected.

According to still another embodiment of the disclosure, the user terminal 200 may detect a user based on sensing data. The user terminal 200 may acquire sensing data by which it can be determined whether a user exists through a sensor. For example, a sensor may refer to an infrared sensor, a movement sensor, or a heat detection sensor, etc. The user terminal 200 may determine whether a user is detected based on the acquired sensing data.

When the user terminal 200 detects a user, the user terminal 200 may store the time when the user was detected as the second time information in the memory of the user terminal 200. Then, the user terminal 200 may transmit the second time information stored in the memory to the home appliance 100.

The home appliance 100 may receive the second time information from the user terminal 200. The second time information may correspond to the first control signal transmitted by the home appliance 100. The communication method by which the second time information is received may be the same as the communication method by which the first control signal was transmitted. However, depending on implementation examples, a communication method by which the first control signal is transmitted and a communication method by which the second time information is received may be different.

The home appliance 100 may determine whether to transmit detailed information to the user terminal 200 based on the first time information and the second time information.

The detailed information may refer to information corresponding to a content. The material of a content displayed on the outputter 130 of the home appliance 100 may be restrictive. Accordingly, information related to a content output through the outputter 130 may be additionally provided to a user through the user terminal 200.

The detailed information may include additional information or web address information that can provide additional information.

According to an embodiment of the disclosure, the detailed information may include additional information corresponding to a content. The additional information may refer to information to be provided to a user. The processor 140 may control the communication interface 120 to transmit the detailed information corresponding to a content to the user terminal 200.

According to another embodiment of the disclosure, the detailed information may include web address information which enables access to a web page that can provide additional information corresponding to a content. The web address information may refer to a URL address. The processor 140 may control the communication interface 120 to transmit the detailed information corresponding to a content to the user terminal 200.

Also, the processor 140 may control the communication interface 120 to transmit a control command for outputting the detailed information to the user terminal 200.

The processor 140 may compare the first time information and the second time information, and determine whether to transmit the detailed information to the user terminal 200. The processor 140 may calculate a difference between the first time information and the second time information.

Then, if the calculated difference between the first time information and the second time information is less than a threshold time, the processor 140 may transmit the second control signal to the user terminal 200.

The second control signal may include at least one of the detailed information or a control command for controlling to output the detailed information.

The first time information may refer to the time when a predetermined event occurred at the home appliance 100, and the second time information may refer to the time when a user was detected at the user terminal 200.

Accordingly, in case a user is detected at the user terminal 200 within a threshold time from the time when the predetermined event occurred at the home appliance 100, the processor 140 may determine that there is a high possibility that the user views specific information (e.g., detailed information corresponding to a content) at the user terminal 200.

When the threshold time passed from the time when the predetermined occurred and when a user is detected at the user terminal 200 or when a user is not detected at the user terminal 200, the processor 140 may determine that there is no need to provide specific information to a user.

The predetermined event may include at least one of an event where the home appliance 100 is manipulated by a user, an event where a user is detected, or an event where a predetermined time arrives, and the second time information may include at least one of time information corresponding to a time when a manipulation of the user terminal 200 was detected, time information corresponding to a time when a movement of the user terminal 200 was detected, or time information corresponding to a time when the user was detected at the user terminal 200.

An event where the home appliance 100 is manipulated may refer to an event where a user input is received through the manipulation interface (150 of FIG. 2) of the home appliance 100.

An event where a user is detected may refer to an event where it is determined that a user is detected based on data acquired through a camera or a sensor. For example, the processor 140 may determine whether a user is detected based on image data acquired by a camera. Also, the processor 140 may determine whether a user is detected based on sensing data acquired from a sensor (e.g., an infrared sensor, a movement sensor, or a heat detection sensor).

An event where a predetermined time arrives may refer to an event where a reservation time set by a user or set automatically arrives. For example, if it is assumed that an advertisement is provided at 13:50:05 every afternoon, arrival of 13:50:05 every afternoon may be an event.

The time information corresponding to the time when a manipulation of the user terminal 200 was detected (e.g., the second time information) may refer to the time when a user input was received through the manipulation interface of the user terminal 200.

The time information corresponding to the time when a movement of the user terminal 200 was detected (e.g., the second time information) may refer to the time when a movement of the user terminal 200 was detected through a sensor, etc.

The time information corresponding to the time when a user was detected at the user terminal 200 (the second time information) may refer to the time when data by which it was determined that a user was detected was received.

According to an embodiment of the disclosure, the user terminal 200 may acquire image data through a camera, and analyze the acquired image data and identify whether a user exists within a threshold distance from the user terminal 200. If a user exists within a threshold distance from the user terminal 200, the user terminal 200 may identify that a user was detected. The second time information may be the time when the image data was acquired.

According to another embodiment of the disclosure, the user terminal 200 may acquire sensing data through an infrared sensor or a heat detection sensor, and analyze the acquired sensing data and identify whether a user exists within a threshold distance from the user terminal 200. If a user exists within a threshold distance from the user terminal 200, the user terminal 200 may identify that a user was detected. The second time information may be the time when the sensing data was acquired.

The processor 140 may control the communication interface 120 to broadcast the first control signal, and receive the second time information corresponding to the first control signal from the user terminal 200 through the communication interface 120.

The first control signal may be transmitted by a broadcasting method. Then, the processor 140 may receive the second time information corresponding to the first control signal by a broadcasting method. The processor 140 may receive the second time information and identification information of a counterpart device that transmitted the second time information together.

According to a different implementation example, the first control signal may be transmitted to the user terminal 200 by a 1:1 communication method. Then, the processor 140 may receive the second time information corresponding to the first control signal by a 1:1 communication method.

The processor 140 may control the communication interface 120 such that the first control signal is broadcasted by a BLE method.

Also, the processor 140 may receive the second time information corresponding to the first control signal from the user terminal 200 by a BLE method. Then, the processor 140 may control the communication interface 120 such that the second control signal is broadcasted by a BLE method.

The outputter 130 may include a display 131, and when a predetermined event is identified, the processor 140 may control the display 131 to display a first UI for guiding transmission (i.e., for guiding a selection to transmit) of the first control signal, and if a first user input is received through the displayed first UI, the processor 140 may control the communication interface 120 to transmit the first control signal to the user terminal 200.

The first UI for guiding transmission of the first control signal may refer to a guide UI inquiring whether to search the user terminal 200 to output the detailed information. Additional explanation regarding the first UI will be made below in FIG. 7 and FIG. 8.

The outputter 130 may include a display 131, and if a difference between the first time information and the second time information is less than a threshold time, the processor 140 may control the display 131 to display a second UI for guiding transmission of the second control signal, and if a second user input is received through the displayed second UI, the processor 140 may control the communication interface 120 to transmit the second control signal to the user terminal 200.

The second UI for guiding transmission of the second control signal may refer to a guide UI inquiring whether to transmit the detailed information to the user terminal 200. Additional explanation regarding the second UI will be made below in FIG. 7 and FIG. 9.

The second control signal may include at least one of the detailed information, a control command for providing the detailed information, or application information for providing the detailed information, and the detailed information may include a URL address related to the content.

The detailed information may include additional information corresponding to the content or web address information that can provide additional information. The web address may refer to the URL address of an external server.

The control command for providing the detailed information may refer to a command for controlling to output the detailed information at the user terminal 200.

The application information for providing the detailed information may refer to information on an application used for outputting the detailed information.

The control command for providing the detailed information may include at least one of a control command for displaying the detailed information on a display of the user terminal 200, a control command for displaying a notification message for providing the detailed information on the display of the user terminal 200, or a control command for outputting the detailed information through a speaker of the user terminal 200.

If the difference between the first time information and the second time information is equal to or greater than the threshold time, the processor 140 may re-transmit the first control signal for re-requesting the second time information corresponding to the time when the user was detected at the user terminal 200 to the user terminal 200 through the communication interface 120, and output a third UI for guiding a manipulation of the user terminal 200 through the outputter 130.

Figure 12:
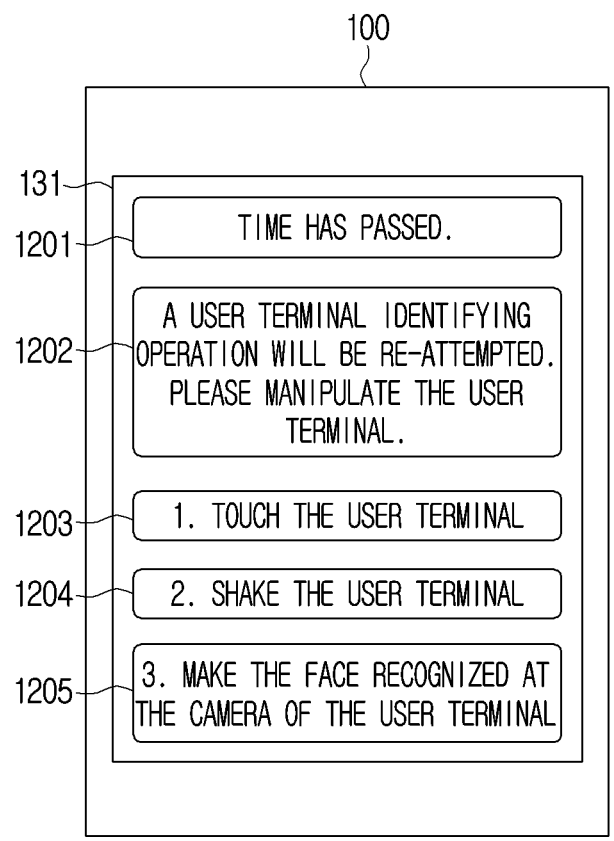
FIG. 12 is a diagram illustrating a UI output from a home appliance when a difference between first time information and second time information is equal to or greater than a threshold time according to an embodiment.

The third UI may correspond to the UIs 1202, 1203, 1204, 1205 in FIG. 12. Detailed explanation regarding re-requesting the second time information will be made below in FIG. 12 to FIG. 13.

If the difference between the first time information and the second time information is equal to or greater than the threshold time, the processor 140 may identify whether the detailed information can be output through the outputter 130, and if it is identified that the detailed information can be output through the outputter 130, the processor 140 may control the outputter 130 to output the detailed information, and if it is identified that the detailed information cannot be output through the outputter 130, the processor 140 may control the outputter 130 to output a notification message notifying that the detailed information cannot be output.

Figure 14:
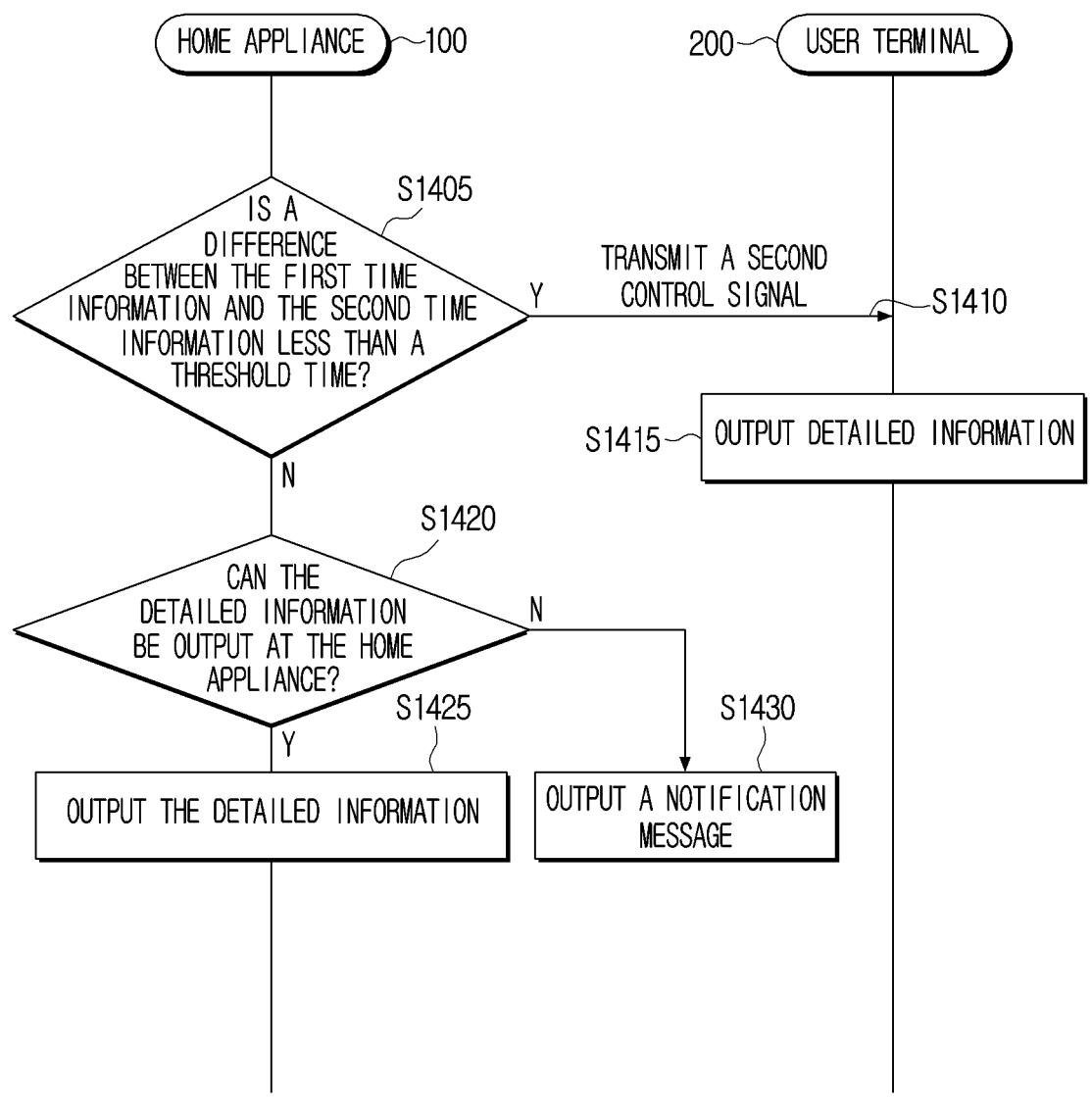
FIG. 14 is a flowchart of a method of outputting detailed information from a home appliance according to an embodiment.
Figure 15:
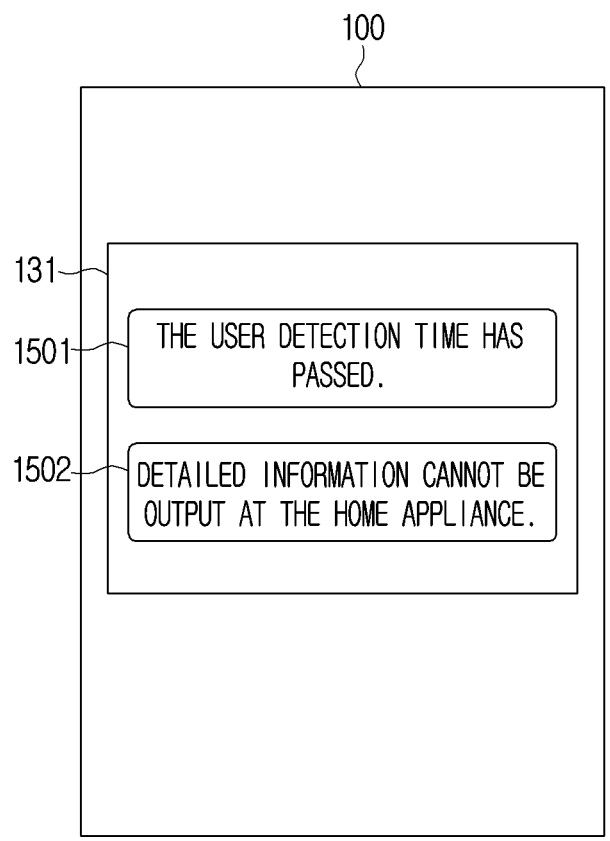
FIG. 15 is a diagram illustrating a UI output from a home appliance according to an embodiment.

The notification message may correspond to the UI 1502 in FIG. 15. Detailed explanation in this regard will be made below in FIG. 14 and FIG. 15.

According to the various embodiments of the disclosure, the home appliance 100 may not directly provide a content to a user, but provide a content by using the user terminal 200. In the case of always providing a content to the user terminal 200 without a specific condition, a user may accumulate a sense of fatigue regarding provisioning of a content. However, the disclosure provides an operation of transmitting detailed information to the user terminal 200 when a user is detected within a threshold time at the user terminal 200 after a predetermined event occurred, and outputting the information. Accordingly, detailed information can be transmitted to the user terminal 200 only in essential situations. Thus, detailed information can be transmitted to the user of the user terminal 200 effectively.

In the above, only simple components constituting the home appliance 100 were illustrated and described, but in actual implementation, various components may additionally be provided. Explanation in this regard will be made below with reference to FIG. 2.

Figure 2:
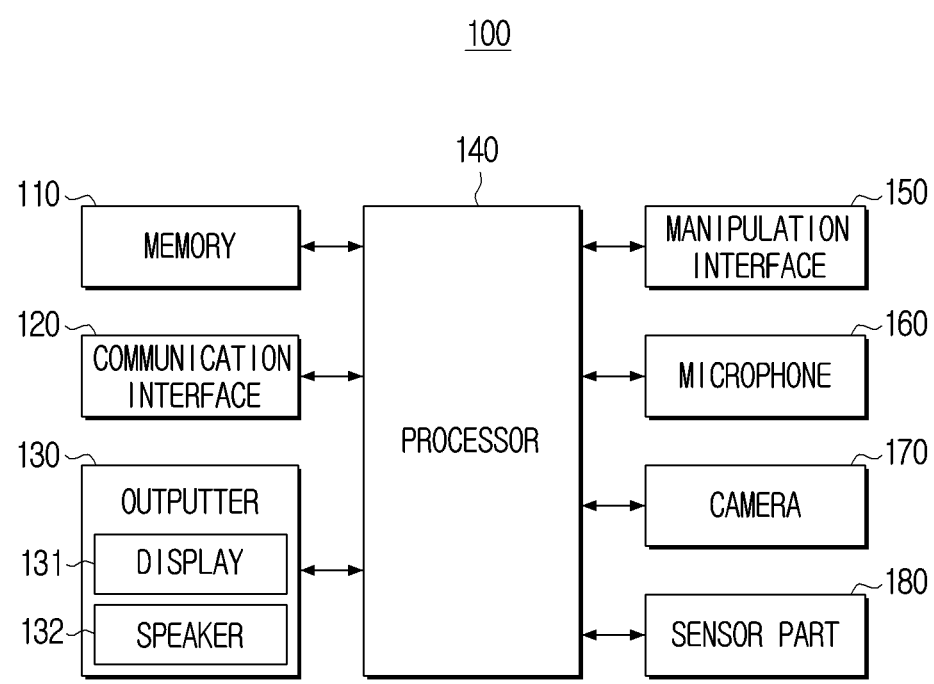
FIG. 2 is a block diagram illustrating a detailed configuration of the home appliance in FIG. 1, according to an embodiment.

FIG. 2 is a block diagram illustrating a detailed configuration of the home appliance in FIG. 1, according to an embodiment.

Referring to FIG. 2, the home appliance 100 may include a memory 110, a communication interface 120, an outputter 130, a processor 140, a manipulation interface 150, a microphone 160, a camera 170, and a sensor part 180.

Among the operations of the memory 110, the communication interface 120, the outputter 130, and the processor 140, regarding operations that are same as the operations described above, overlapping explanation will be omitted.

The display 131 may be implemented as displays in various forms such as a liquid crystal display (LCD), an organic light emitting diodes (OLED) display, a plasma display panel (PDP), etc. In the display 131, driving circuits that may be implemented in forms such as an a-si thin-film transistor (TFT), a low temperature poly silicon (LTPS) TFT, an organic TFT (OTFT) and the like, a backlight unit, etc. may also be included together. In addition, the display 131 may also be implemented as a touch screen coupled with a touch sensor, a flexible display, a 3D display, etc.

Also, the display 131 according to an embodiment of the disclosure may include not only a display panel outputting images, but also a bezel housing the display panel. In particular, a bezel according to an embodiment of the disclosure may include a touch sensor for detecting user interactions.

The speaker 132 may be a component that outputs not only various kinds of audio data processed at an input/output interface, but also various kinds of notification sounds or voice messages, etc.

The manipulation interface 150 may be implemented as a device such as a button, a touch pad, a mouse, and a keyboard, or as a touch screen that can perform the aforementioned display function and a manipulation input function together. The button may be various types of buttons such as a mechanical button, a touch pad, a wheel, etc. formed in any areas such as the front surface part, the side surface part, the rear surface part, etc. of the exterior of the main body of the home apparatus 100.

The microphone 160 is a component for receiving input of a user voice or other sounds and converting them into audio data.

The microphone 160 may receive a user's voice in an activated state. For example, the microphone 160 may be formed as an integrated type in the upper side or front surface direction, the side surface direction, etc. of the home appliance 100. The microphone 160 may include various components such as a microphone collecting user voices in analog forms, an amp circuit that amplifies the collected user voices, an analog-to-digital (AD) conversion circuit that samples the amplified user voices and converts them into digital signals, a filter circuit that removes noise components from the converted digital signals, etc.

The camera 170 is a component for photographing a subject and generating a photographed image, and a photographed image is a concept that includes both a moving image and a still image. The camera 170 may acquire images for at least one external device, and it may be implemented as a camera, a lens, an infrared sensor, etc.

The camera 170 may include a lens and an image sensor. As types of a lens, there are general generic-purpose lenses, wide-angle lenses, zoom lenses, etc., and the type may be determined according to the type, the characteristic, the use environment, etc. of the home appliance 100. As an image sensor, a complementary metal oxide semiconductor (CMOS) and a charge coupled device (CCD), etc. may be used.

The camera 170 outputs an incident light as an image signal. The camera 170 may include a lens, pixels, and an AD converter. The lens may collect light of a subject and make an optical image formed on a photographing area, and the pixels may output the lights introduced through the lens as an image signal in an analog form. Then, the AD converter may convert the image signal in an analog form into an image signal in a digital form and output the signal. The camera 170 may be arranged to photograph the front surface direction of the home appliance 100, and photograph a user that exists on the front surface of the home appliance 100 and generate a photographed image.

The sensor part 180 may refer to a sensor that acquires sensing data. For example, the sensor part 180 may include at least one of an image sensor, an infrared sensor, a movement sensor, or a heat detection sensor.

Figure 3:
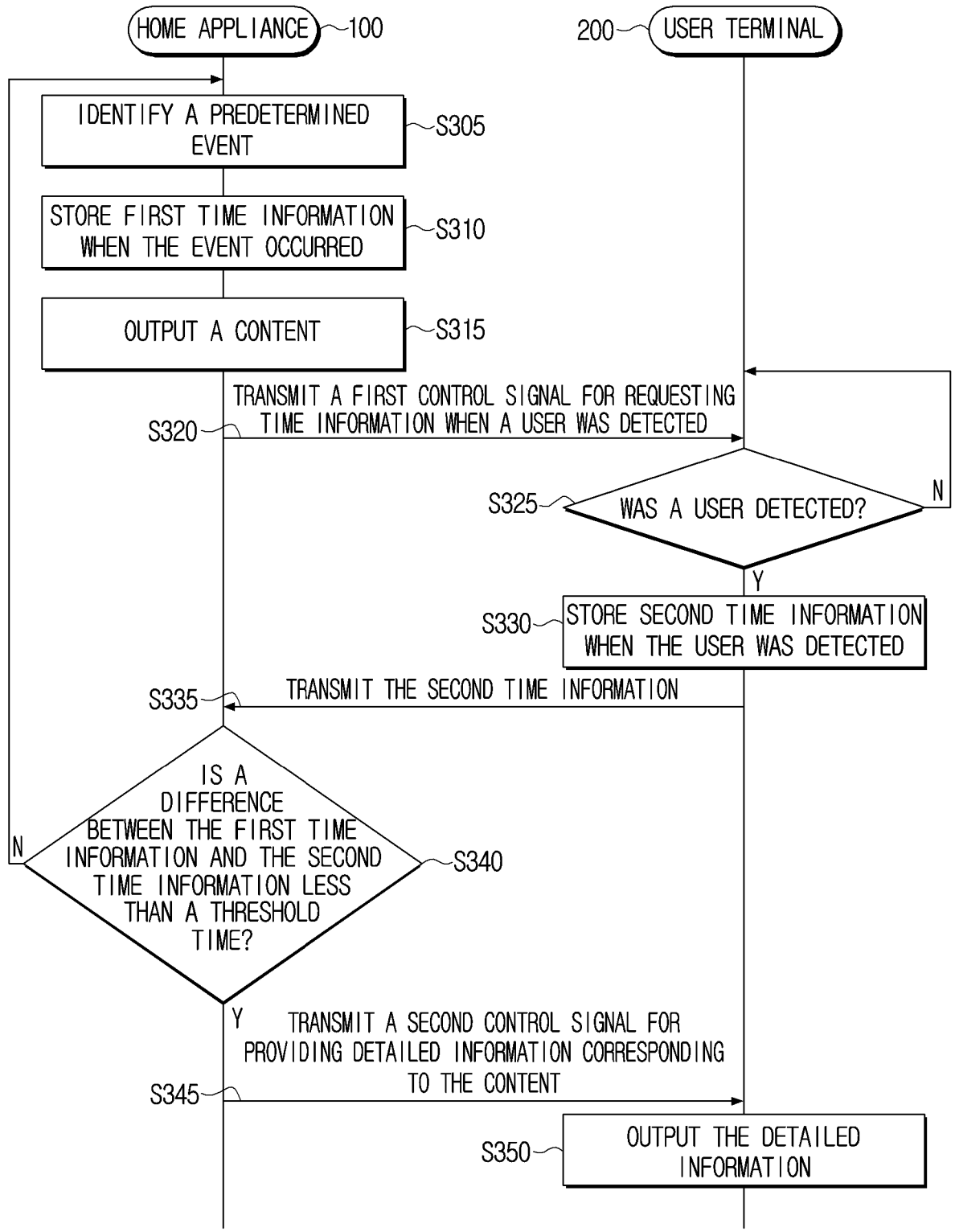
FIG. 3 is a flowchart of a method for outputting detailed information according to an embodiment.

FIG. 3 is a flowchart of a method for outputting detailed information according to an embodiment.

Referring to FIG. 3, the home appliance 100 may identify whether a predetermined event occurs in operation S305. The predetermined event may refer to at least one of an advertisement provision event that provides an advertisement at any time (or a predetermined time) at the home appliance, a notification event related to the home appliance, a home appliance manipulation event, a user detection event, or an event of requesting detailed information by a user.

The home appliance 100 may store first time information when the predetermined event occurs in operation S310. For example, the home appliance 100 may store the time when it was identified that a user is located within a threshold distance from the home appliance 100 as the first time information.

The home appliance 100 may output a content in operation S315. The output content may refer to a content that is provided to the user through the home appliance 100. The order of the operations S310 and S315 may be changed. For example, the operation S310 may be performed after the operation S315.

The home appliance 100 may transmit a first control signal for requesting time information when a user was detected (e.g., second time information) to the user terminal 200 in operation S320. Then, when the first control signal is received from the home appliance 100, the user terminal 200 may detect a user in operation S325.

According to an embodiment of the disclosure, the user terminal 200 may detect a user according to whether the user terminal 200 is manipulated. For example, if it is identified that the user terminal 200 is manipulated, the user terminal 200 may determine that a user was detected.

According to another embodiment of the disclosure, the user terminal 200 may detect a user through a camera or a sensor part included in the user terminal 200. For example, if it is identified that a user exists within a threshold distance from the user terminal 200, the user terminal 200 may determine that a user was detected.

If it is identified that the user terminal 200 did not detect a user in operation S325-N, the user terminal 200 may repeat a user detecting operation during a threshold time (which may be different from the threshold time in operation S340).

If it is identified that the user terminal 200 detected a user in operation S325-Y, the user terminal 200 may store second time information of detecting a user in operation S330.

Then, the user terminal 200 may transmit the stored second time information to the home appliance 100 in operation S335.

When the home appliance 100 receives the second time information from the user terminal 200, the home appliance 100 may identify whether a difference between the first time information and the second time information is less than a threshold time in operation S340. For example, it is assumed that the first time information is 13:50:05 and the second time information is 13:50:10. The difference between the first time information and the second time information may be five seconds.

If the difference between the first time information and the second time information is equal to or greater than the threshold time in operation S340-N, the home appliance 100 may repetitively identify a predetermined event.

If the difference between the first time information and the second time information is less than the threshold time in operation S340-Y, the home appliance 100 may transmit a second control signal for providing detailed information corresponding to the content output at the operation S315 to the user terminal 200 in operation S345. Then, when the second control signal is received from the home appliance 100, the user terminal 200 may output the detailed information in operation S350.

Figure 4:
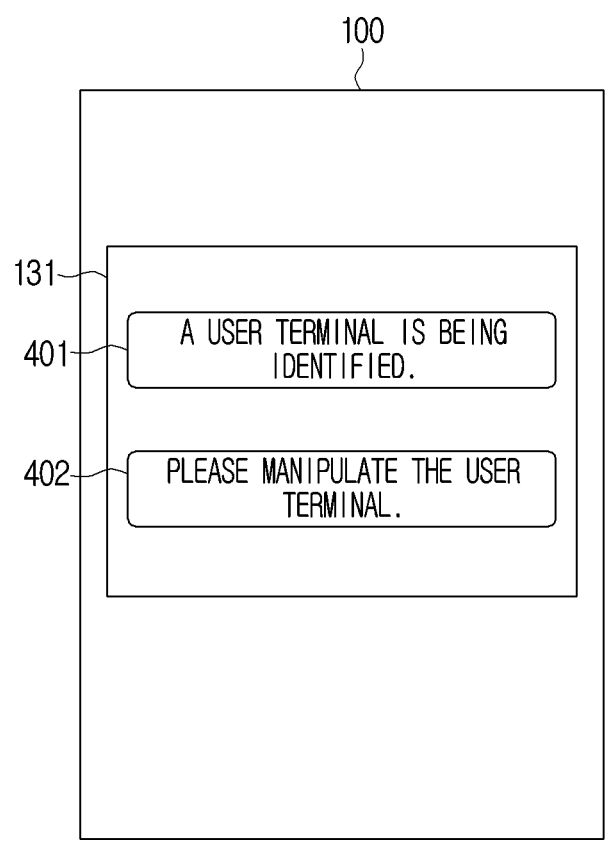
FIG. 4 is a diagram illustrating a UI for guiding to manipulate a user terminal, according to an embodiment.

FIG. 4 is a diagram illustrating a UI for guiding to manipulate a user terminal, according to an embodiment.

Referring to FIG. 4, the home appliance 100 may transmit a first control signal for identifying whether a user was detected at the user terminal 200 if a predetermined event occurs, and wait during a threshold time until it receives second time information corresponding to the first control signal from the user terminal 200.

The home appliance 100 may display at least one UI between a UI 401 including a notification message for notifying that it is identifying the user terminal 200 until it receives the second time information and a UI 402 including a notification message for guiding such that a user is detected at the user terminal 200. For example, the UI 402 may include a message for manipulating the user terminal 200.

Figure 5:
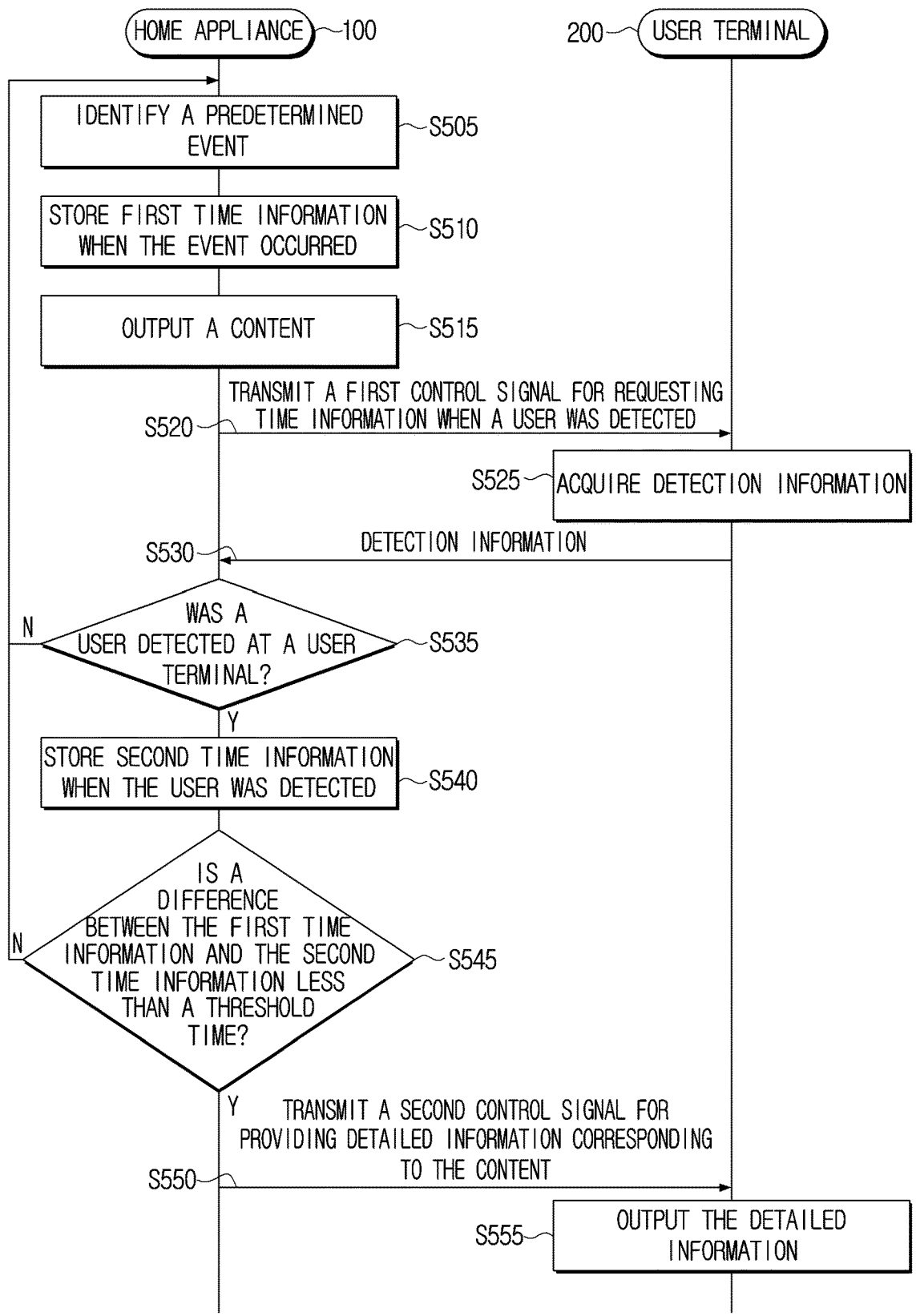
FIG. 5 is a flowchart of a method for outputting detailed information according to an embodiment.

FIG. 5 is a flowchart of a method for outputting detailed information according to an embodiment.

Referring to FIG. 5, the operations S505, S510, S515, and S520 may correspond to the operations S305, S310, S315, and S320 in FIG. 3. Accordingly, overlapping explanation will be omitted.

If a first control signal is received from the home appliance 100, the user terminal 200 may acquire detection information in operation S525. Then, the user terminal 200 may transmit the acquired detection information to the home appliance 100 in operation S530. The detection information may refer to image data photographed by the camera of the user terminal 200 or sensing data acquired from the sensor part of the user terminal 200.

When the detection information is received from the user terminal 200, the home appliance 100 may analyze whether a user is detected at the user terminal 200 in operation S535. If it is not identified that a user is detected at the user terminal 200 in operation S535-N, the home appliance 100 may repetitively identify a predetermined event. If it is identified that a user is detected at the user terminal 200 in operation S535-Y, the home appliance 100 may store second time information when a user was detected in operation S540. The detection information acquired in the operation S525 may include time information.

The home appliance 100 may identify whether a difference between the first time information and the second time information is less than a threshold time in operation S545. If the difference between the first time information and the second time information is equal to or greater than the threshold time in operation S545-N, the home appliance 100 may repetitively identify the predetermined event. If the difference between the first time information and the second time information is less than the threshold time in operation S545-Y, the home appliance 100 may transmit a second control signal for providing detailed information corresponding to the content to the user terminal 200 in operation S550. Then, when the second control signal is received from the home appliance 100, the user terminal 200 may output the detailed information in operation S555.

Figure 6:
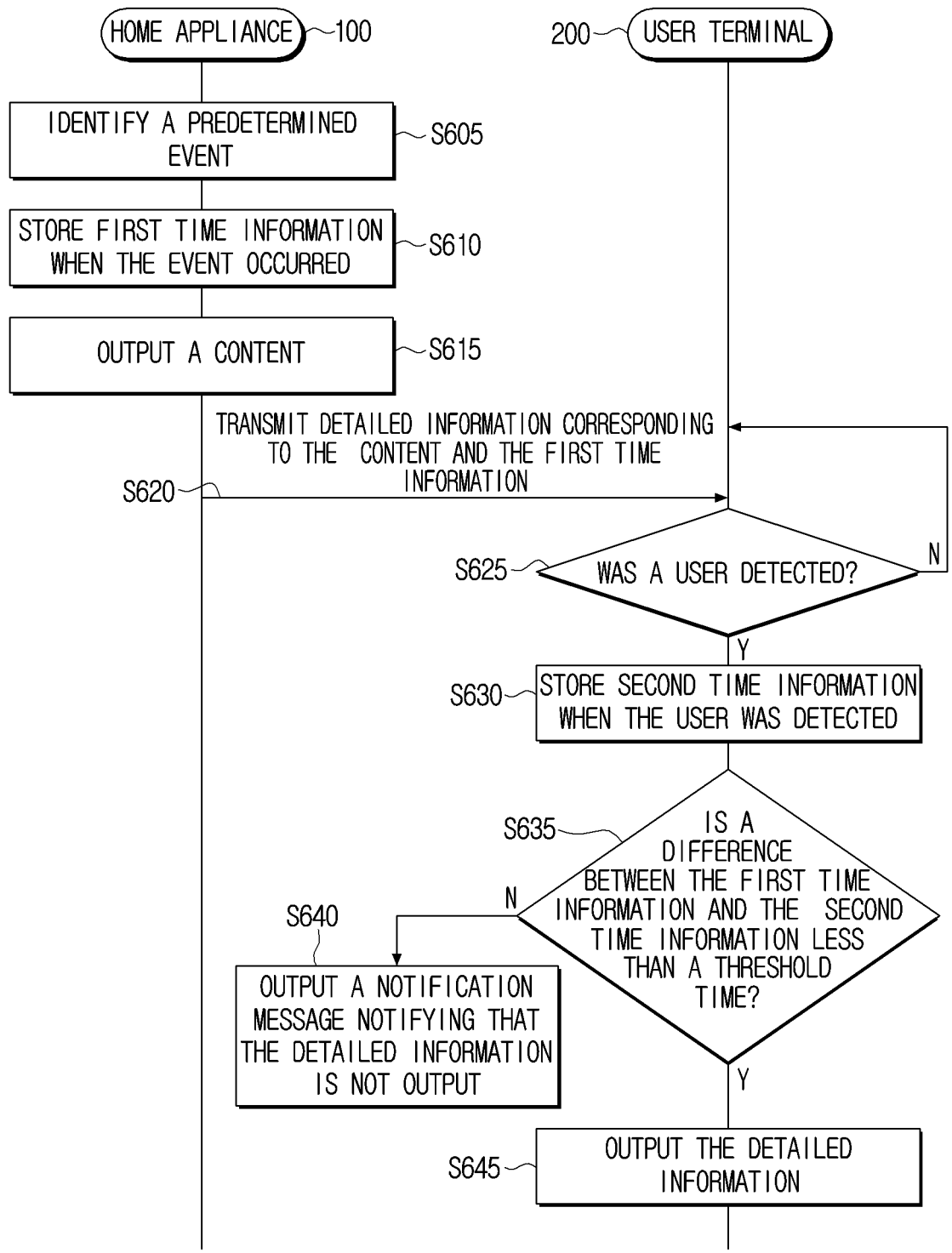
FIG. 6 is a flowchart of a method for outputting detailed information according to an embodiment.

FIG. 6 is a flowchart of a method for outputting detailed information according to an embodiment.

Referring to FIG. 6, the operations S605, S610, and S615 may correspond to the operations S305, S310, and S315. Accordingly, overlapping explanation will be omitted.

The home appliance 100 may transmit the detailed information and the first time information corresponding to the content to the user terminal 200 after outputting the content in operation S620. Then, when the detailed information and the first time information corresponding to the content is received from the home appliance 100, the user terminal 200 may identify whether a user is detected at the user terminal 200 in operation S625.

If a user is not detected in operation S625-N, the home appliance 100 may repetitively determine whether a user is detected during a threshold time (which may be different from the threshold time in operation S635). If a user is detected in operation S625-Y, the home appliance 100 may store the time when the user was detected as second time information in operation S630. Then, the user terminal 200 may identify whether a difference between the first time information and the second time information received from the home appliance 100 is less than a threshold time in operation S635. The user terminal 200 may acquire a difference between the first time information and the second time information.

Then, the user terminal 200 may analyze the difference between the first time information and the second time information. If the difference between the first time information and the second time information is equal to or greater than the threshold time in operation S635-N, the user terminal 200 may output a notification message that the detailed information is not output (a notification message including a content that the detailed information is not output) in operation S640. If the difference between the first time information and the second time information is less than the threshold time in operation S635-Y, the user terminal 200 may output the detailed information in operation S645.

In FIG. 6, it was described that the home appliance 100 transmits the detailed information to the user terminal 200 and the user terminal 200 outputs the detailed information, but depending on implementation examples, the disclosure may be implemented in a form where the home appliance 100 transmits URL information that can access the detailed information to the user terminal 200, and the user terminal 200 receives the detailed information from an external server by using the URL information and outputs the received detailed information.

Figure 7:
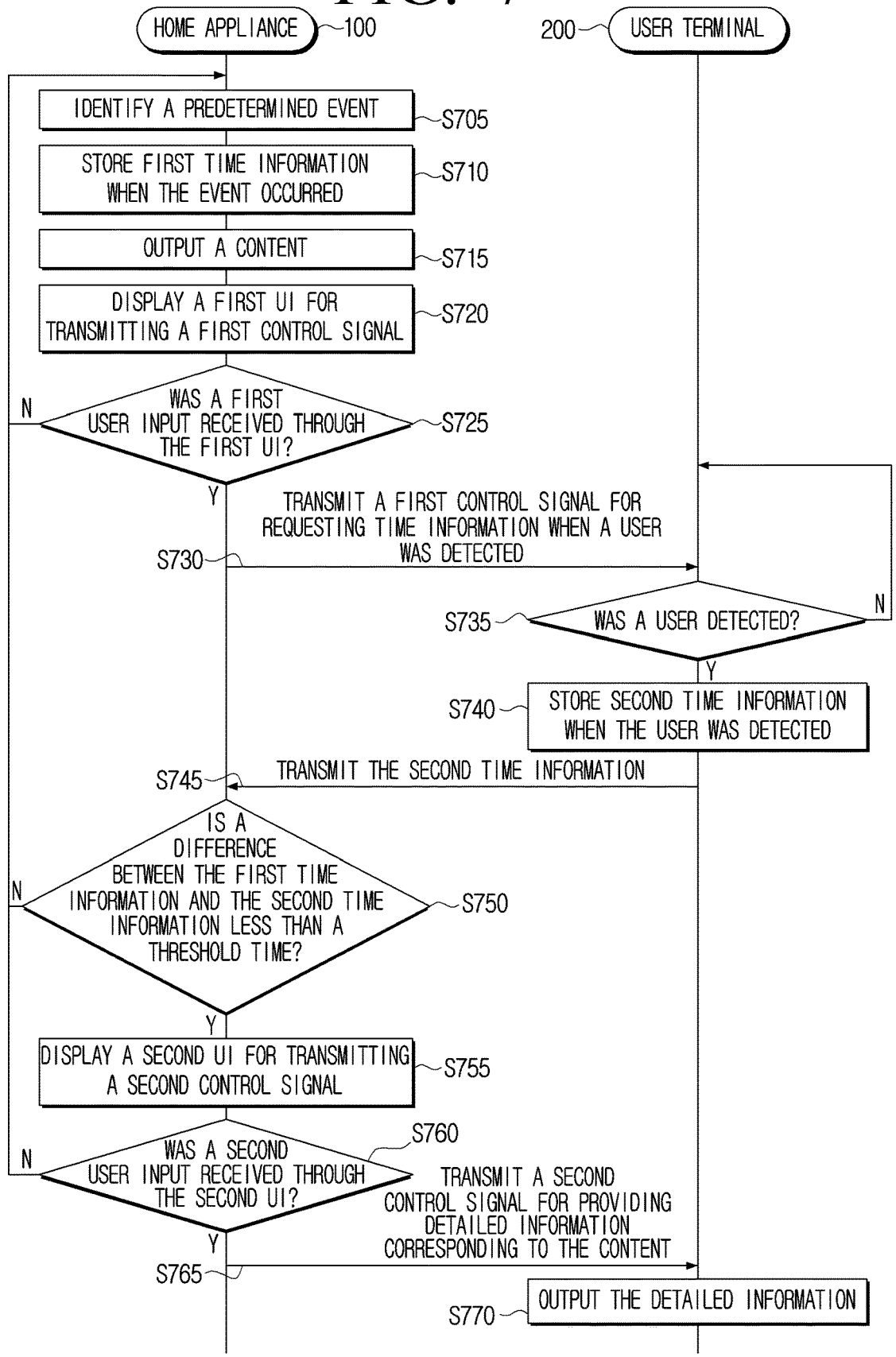
FIG. 7 is a flowchart of a method for outputting detailed information according an embodiment.

FIG. 7 is a flowchart of a method for outputting detailed information according an embodiment.

Referring to FIG. 7, the operations S705, S710, and S715 may correspond to the operations S305, S310, and S315. Accordingly, overlapping explanation will be omitted.

The home appliance 100 may display a first UI for transmitting a first control signal to the user terminal 200 on the display 131 in operation S720. Then, the home appliance 100 may identify whether a first user input was received through the first UI in operation S725.

If the first user input is not received through the first UI in operation S725-N, the home appliance 100 may repetitively identify a predetermined event. If the first user input is received through the first UI in operation S725-Y, the home appliance 100 may transmit the first control signal for requesting time information when a user was detected to the user terminal 200 in operation S730.

When the first control signal is received from the home appliance 100, the user terminal 200 may identify whether a user is detected at the user terminal 200 in operation S735. If it is not identified that a user is detected in operation S735-N, the user terminal 200 may repetitively repeat a user detecting operation during a threshold time (which may be different from the threshold time in operation S750). If it is identified that a user is detected in operation S735-Y, the user terminal 200 may store the time when the user was detected as second time information in operation S740. Then, the user terminal 200 may transmit the second time information to the home appliance 100 in operation S745.

When the second time information is received from the user terminal 200, the home appliance 100 may identify whether a difference between the first time information and the second time information is less than a threshold time in operation S750. If the difference between the first time information and the second time information is equal to or greater than the threshold time in operation S750-N, the home appliance 100 may repetitively identify a predetermined event. If the difference between the first time information and the second time information is less than the threshold time in operation S750-Y, the home appliance 100 may display a second UI for transmitting a second control signal on the display 131 in operation S755. Then, the home appliance 100 may identify whether a second user input was received through the second UI in operation S760.

If the second user input is not received through the second UI in operation S760-N, the home appliance 100 may repetitively identify a predetermined event. If the second user input is received through the second UI in operation S760-Y, the home appliance 100 may transmit a second control signal for providing detailed information corresponding to the content to the user terminal 200 in operation S765. Then, when the second control signal is received from the home appliance 100, the user terminal 200 may output the detailed information in operation S770.

Figure 8:
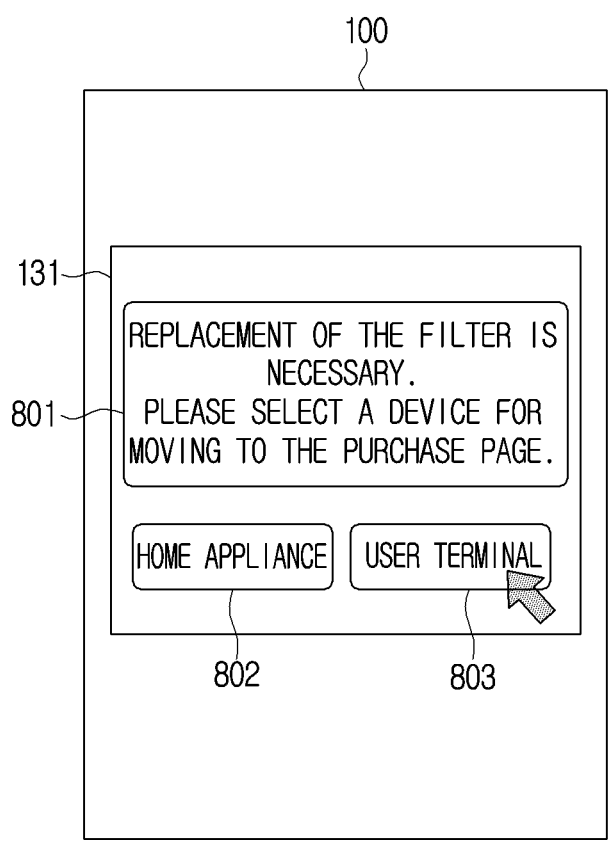
FIG. 8 is a diagram illustrating a UI for selecting a device where detailed information will be output according to an embodiment.

FIG. 8 is a diagram illustrating a UI for selecting a device where detailed information will be output according to an embodiment.

Referring to FIG. 8, the home appliance 100 may display the first UI described in the operation S720 in FIG. 7 on the display 131. The first UI may include at least one UI between a UI 801 including a notification message or UIs 802, 803 for selecting a device to output detailed information.

If a first user input by which a user selects the user terminal 200 is received through the displayed UI 803, the home appliance 100 may transmit a first control signal to the user terminal 200.

Depending on implementation examples, the UIs 801, 802, 803 in FIG. 8 may be included in the second UI in the operation S755 in FIG. 7.

Figure 9:
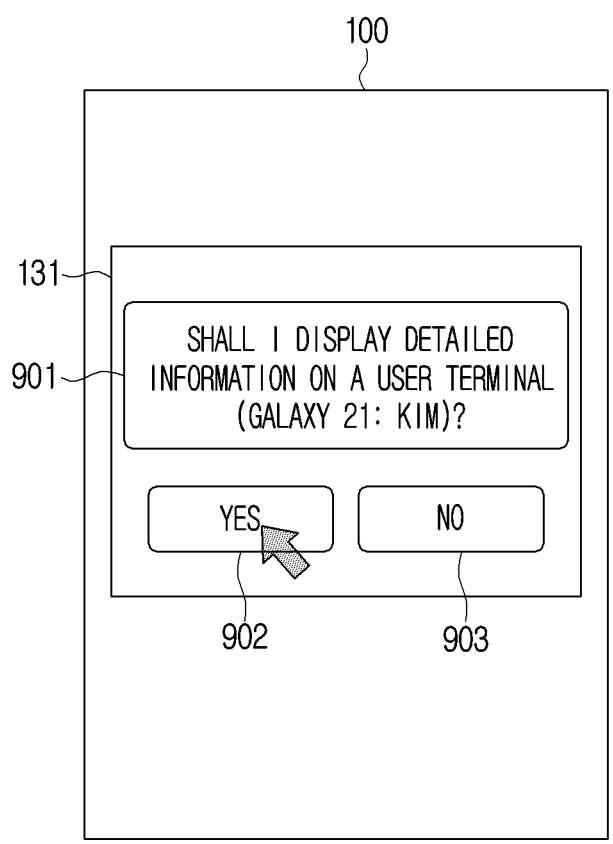
FIG. 9 is a diagram illustrating a UI for guiding whether to output detailed information at a user terminal according to an embodiment.

FIG. 9 is a diagram illustrating a UI for guiding whether to output detailed information at a user terminal according to an embodiment.

Referring to FIG. 9, the home appliance 100 may display the second UI described in the operation S755 in FIG. 7 on the display 131. The second UI may include at least one UI between a UI 901 including a notification message or UIs 902, 903 that re-identify whether to output detailed information at the user terminal 200.

If a second user input is received through the displayed UI 902, the home appliance 100 may transmit a second control signal to the user terminal 200.

Depending on implementation examples, the UIs 901, 902, 903 in FIG. 9 may be included in the first UI in the operation S720 in FIG. 7.

Figure 10:
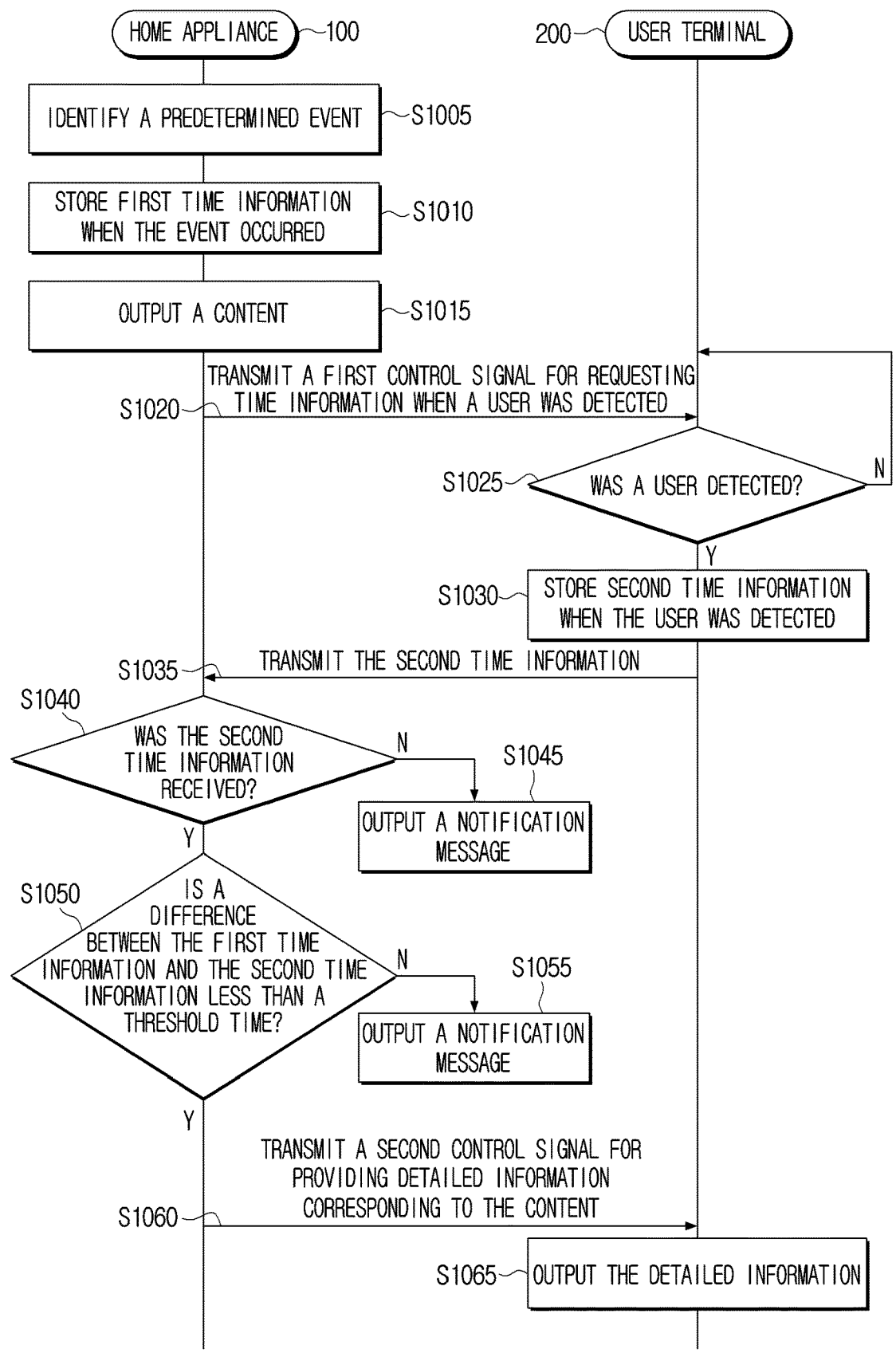
FIG. 10 is a flowchart of a method of outputting a notification message from a home appliance according to an embodiment.

FIG. 10 is a flowchart of a method of outputting a notification message from a home appliance according to an embodiment.

Referring to FIG. 10, the operations S1005, S1010, S1015, S1020, S1025, S1030, and S1035 may correspond to the operations S305, S310, S315, S320, S325, S330, and S335. Accordingly, overlapping explanation will be omitted.

The home appliance 100 may identify whether the second time information is received within a threshold time from the first time information (or from the time when the content was output) in operation S1040. If the second time information is not received within the threshold time from the first time information in operation S1040-N, the home appliance 100 may output a notification message for notifying that the user terminal 200 was not identified in operation S1045. If the second time information is received within the threshold time from the first time information in operation S1040-Y, the home appliance 100 may identify whether a difference between the first time information and the second time information is less than a threshold time in operation S1050.

If the difference between the first time information and the second time information is equal to or greater than the threshold time in operation S1050-N, the home appliance 100 may output a notification message for notifying that a detection time passed in operation S1055. If the difference between the first time information and the second time information is less than the threshold time in operation S1050-Y, the home appliance 100 may transmit a second control signal for providing detailed information corresponding to the content to the user terminal 200 in operation S1060. Then, when the second control signal is received, the user terminal 200 may output the detailed information in operation S1065.

Figure 11:
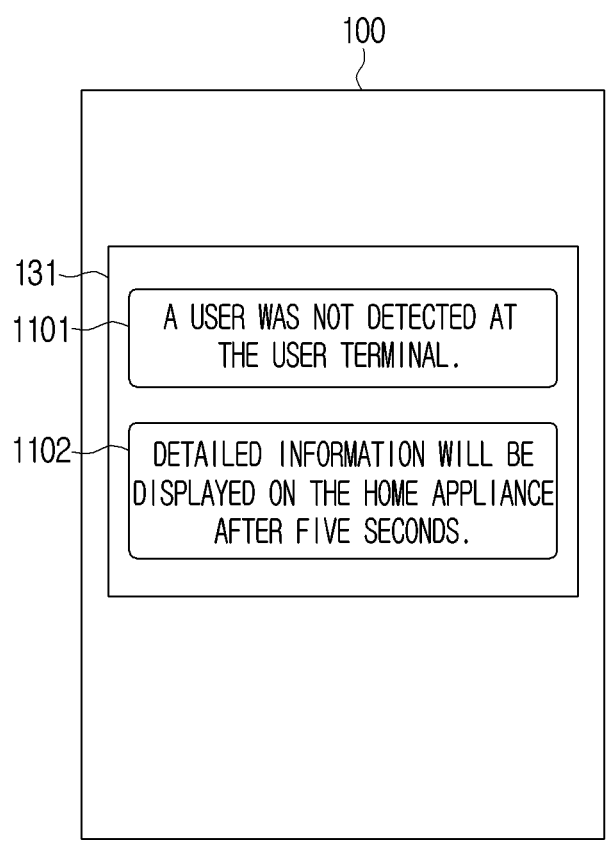
FIG. 11 is a diagram of a UI output from a home appliance in case a user is not identified at a user terminal according to an embodiment.

FIG. 11 is a diagram of a UI output from a home appliance in case a user is not identified at a user terminal according to an embodiment.

Referring to FIG. 11, the home appliance 100 may display the notification message in the operation S1045 in FIG. 10 on the display 131. The notification message may include at least one UI between a UI 1101 including a notification message for notifying that a user was not detected at the user terminal 200 and a UI 1102 including a notification message for notifying that the home appliance 100 will directly display detailed information after a threshold time.

In FIG. 11, it was described that the notification message is displayed through the display 131, but depending on other implementation examples, the notification message may be output in the form of audio data through the speaker 132.

FIG. 12 is a diagram illustrating a UI output from a home appliance when a difference between first time information and second time information is equal to or greater than a threshold time according to an embodiment.

Referring to FIG. 12, the home appliance 100 may display the notification message in the operation S1055 in FIG. 10 on the display 131. The notification message may include a UI 1201 including a notification message for notifying that the threshold time passed.

If the difference between the first time information and the second time information in the operation S1050 is less than the threshold time, the home appliance 100 may perform an operation of re-detecting a user at the user terminal 200. A specific operation in this regard will be described below in FIG. 13.

If it is determined that the home appliance 100 re-detects a user at the user terminal 200, the home appliance 100 may display a UI corresponding to a user re-detecting operation on the display 131. The home appliance 100 may display at least one UI between a UI 1202 including a notification message for notifying a user re-detecting operation and UIs 1203, 1204, 1205 guiding a user's action such that the user is detected on the display 131.

Figure 13:
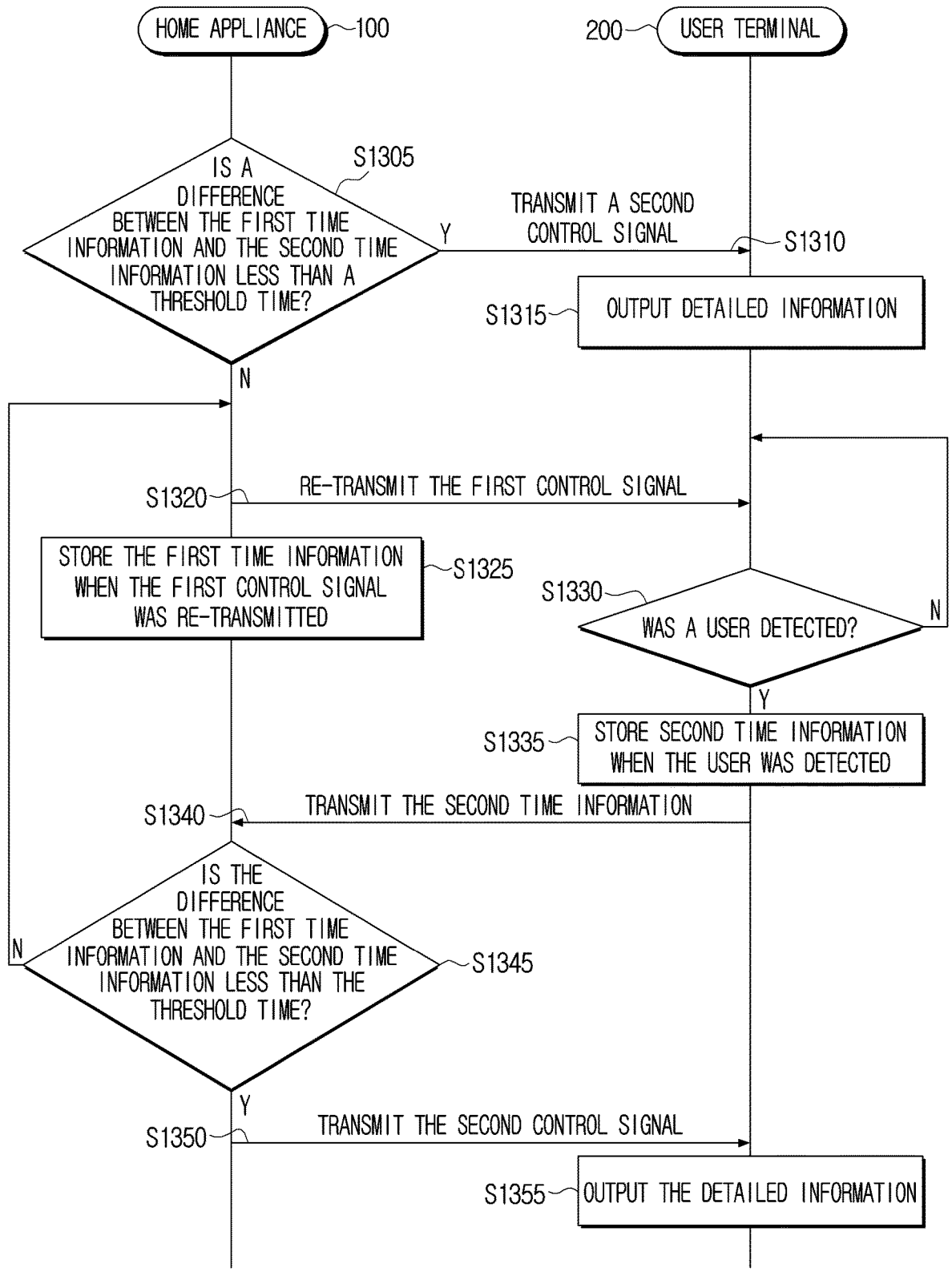
FIG. 13 is a flowchart of a method of re-transmitting a first control signal according to an embodiment.

FIG. 13 is a flowchart of a method of re-transmitting a first control signal according to an embodiment.

Referring to FIG. 13, the operations S1305, S1310, and S1315 may correspond to the operations S340, S345, and S350 in FIG. 3. Accordingly, overlapping explanation will be omitted. In the operation S340 in FIG. 3, it was described that, if the difference between the first time information and the second time information is equal to or greater than the threshold time in the operation S340-N, the home appliance 100 repetitively identifies a predetermined event. However, in the embodiment in FIG. 13, an operation of repetitively re-transmitting the first control signal to the user terminal 200 may be performed instead of an operation of repetitively identifying a predetermined event.

If the difference between the first time information and the second time information is equal to or greater than the threshold time in operation S1305-N, the home appliance 100 may re-transmit the first control signal for re-requesting time information that a user was detected to the user terminal 200 in operation S1320.

The home appliance 100 may store the time when the first control signal was re-transmitted to the user terminal 200 as first time information in operation S1325. The first time information in the operation S1325 and the first time information in the operation S310 in FIG. 3 may be different.

If the first control signal is re-received from the home appliance 100, the user terminal 200 may re-detect a user in operation S1330. If a user is not re-detected in operation S1330-N, the user terminal 200 may repetitively re-detect a user during a threshold time (it may be different from the threshold times in the operations S1305 and S1345). If a user is re-detected in operation S1330-Y, the user terminal 200 may store the time when a user was re-detected as second time information in operation S1335. Then, the user terminal 200 may transmit the second time information to the home appliance 100 in operation S1340. The second information in the operation S1335 and the second time information in the operation S330 in FIG. 3 may be different.

When the second time information is received from the user terminal 200, the home appliance 100 may identify whether a difference between the first time information (acquired in the operation S1325) and the second time information (acquired in the operation S1335) is less than a threshold time in operation S1345. If the difference between the first time information and the second time information is equal to or greater than the threshold time in operation S1345-N, the home appliance 100 may repetitively re-transmit the first control signal to the user terminal 200. If the difference between the first time information and the second time information is less than the threshold time in operation S1345-Y, the home appliance 100 may transmit a second control signal to the user terminal 200 in operation S1350. Then, when the second control signal is received from the home appliance 100, the user terminal 200 may output the detailed information in operation S1355.

FIG. 14 is a flowchart of a method of outputting detailed information from a home appliance according to an embodiment.

Referring to FIG. 14, the operations S1405, S1410, and S1415 may correspond to the operations S340, S345, and S350 in FIG. 3. Accordingly, overlapping explanation will be omitted. In the operation S340 in FIG. 3, it was described that, if the difference between the first time information and the second time information is equal to or greater than the threshold time in the operation S340-N, the home appliance 100 repetitively identifies a predetermined event. However, in the embodiment in FIG. 14, an operation of directly outputting the detailed information at the home appliance 100 may be performed instead of an operation of repetitively identifying a predetermined event.

If the difference between the first time information and the second time information is equal to or greater than the threshold time in operation S1405-N, the home appliance 100 may identify whether the detailed information can be directly output at the home appliance 100 in operation S1420. If the detailed information can be directly output at the home appliance 100 in operation S1420-Y, the home appliance 100 may directly output the detailed information in operation S1425. If the detailed information cannot be directly output at the home appliance 100 in operation S1420-N, the home appliance 100 may output a notification message for notifying that the detailed information cannot be directly output at the home appliance 100 in operation S1430.

FIG. 15 is a diagram illustrating a UI output from a home appliance according to an embodiment.

Referring to FIG. 15, the home appliance 100 may display the notification message in the operation S1430 in FIG. 14 on the display 131. The notification message may include at least one of a UI 1501 including a notification message for notifying that a detection time for detecting a user at the user terminal 200 (or a threshold time) passed or a UI 1502 including a notification message for notifying that the detailed information cannot be directly output at the home appliance 100.

Figure 16:
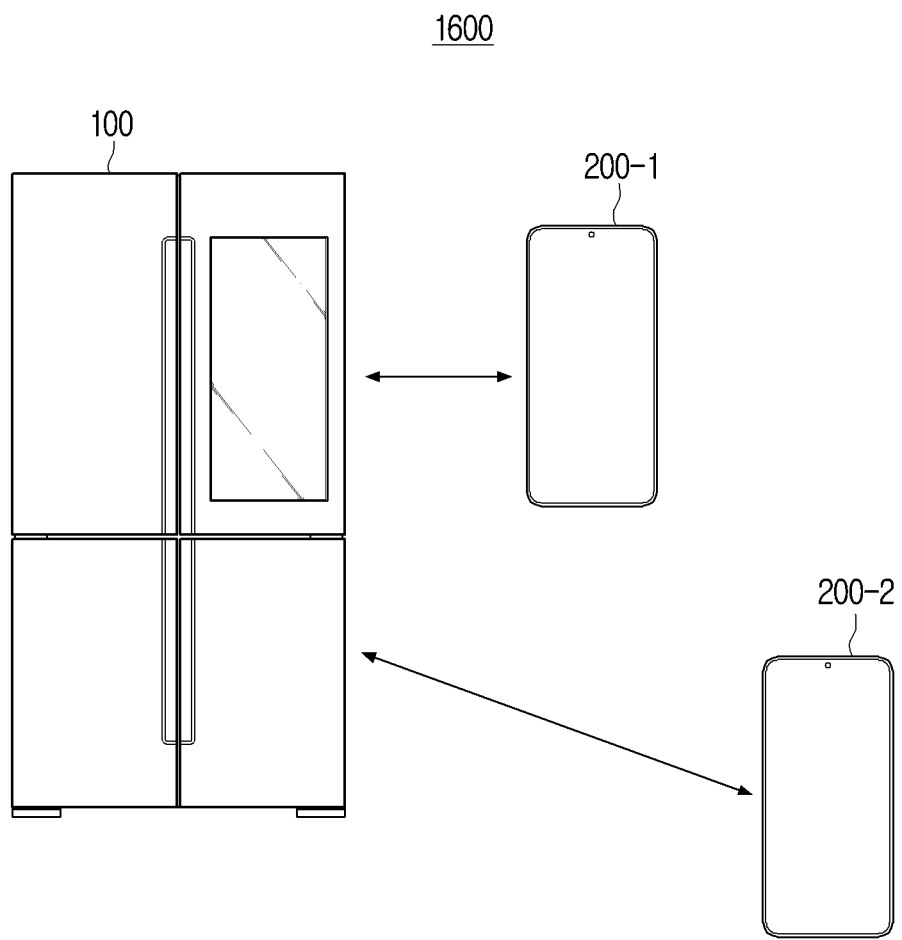
FIG. 16 is a diagram illustrating a system including a home appliance and a plurality of user terminals according to an embodiment.

FIG. 16 is a diagram illustrating a system including a home appliance and a plurality of user terminals according to an embodiment.

Referring to FIG. 16, the system 1600 may include the home appliance 100 and a plurality of user terminals 200-1, 200-2. It may be assumed that the plurality of user terminals include a first user terminal 200-1 and a second user terminal 200-2.

The home appliance 100 may broadcast a first control signal, and receive second time information corresponding to the first control signal respectively from the plurality of user terminals. When the second time information is received respectively from the plurality of user terminals, the home appliance 100 may identify the number of the user terminals. In the second time information, information on the device that transmitted the second time information may be additionally included other than the information on the time when a user was detected at a user terminal.

When the home appliance 100 receives the second time information from user terminals different from one another, the home appliance 100 may determine from which device among the different user terminals the detailed information will be output.

According to an embodiment of the disclosure, the home appliance 100 may determine to output the detailed information from a user terminal which is closer in distance to the home appliance 100 among the plurality of user terminals. The home appliance 100 may acquire distance information from the home appliance 100 to the first user terminal 200-1 and distance information from the home appliance 100 to the second user terminal 200-2. Then, the home appliance 100 may compare the acquired distance information, and determine which terminal between the first user terminal 200-1 and the second user terminal 200-2 is closer to the home appliance 100.

According to another embodiment of the disclosure, the home appliance 100 may determine to output the detailed information from a terminal having a higher priority among the plurality of user terminals. The home appliance 100 may store information related to the plurality of user terminals in advance. The priorities of the plurality of user terminals may be determined. It is assumed that the first user terminal 200-1 is the terminal of the first priority and the second user terminal 200-2 is the terminal of the second priority. The home appliance 100 may store such information on priorities (or a list of priorities). Accordingly, the home appliance 100 may determine to output the detailed information from the terminal having a higher priority (e.g., the first user terminal 200-1) between the first user terminal 200-1 and the second user terminal 200-2. Priority information may be different according to types of home appliances. For example, in the case of a refrigerator, the priority of the first user terminal 200-1 may be higher than the priority of the second user terminal 200-2, and in the case of a TV, the priority of the first user terminal 200-1 may be lower than the priority of the second user terminal 200-2.

Figure 17:
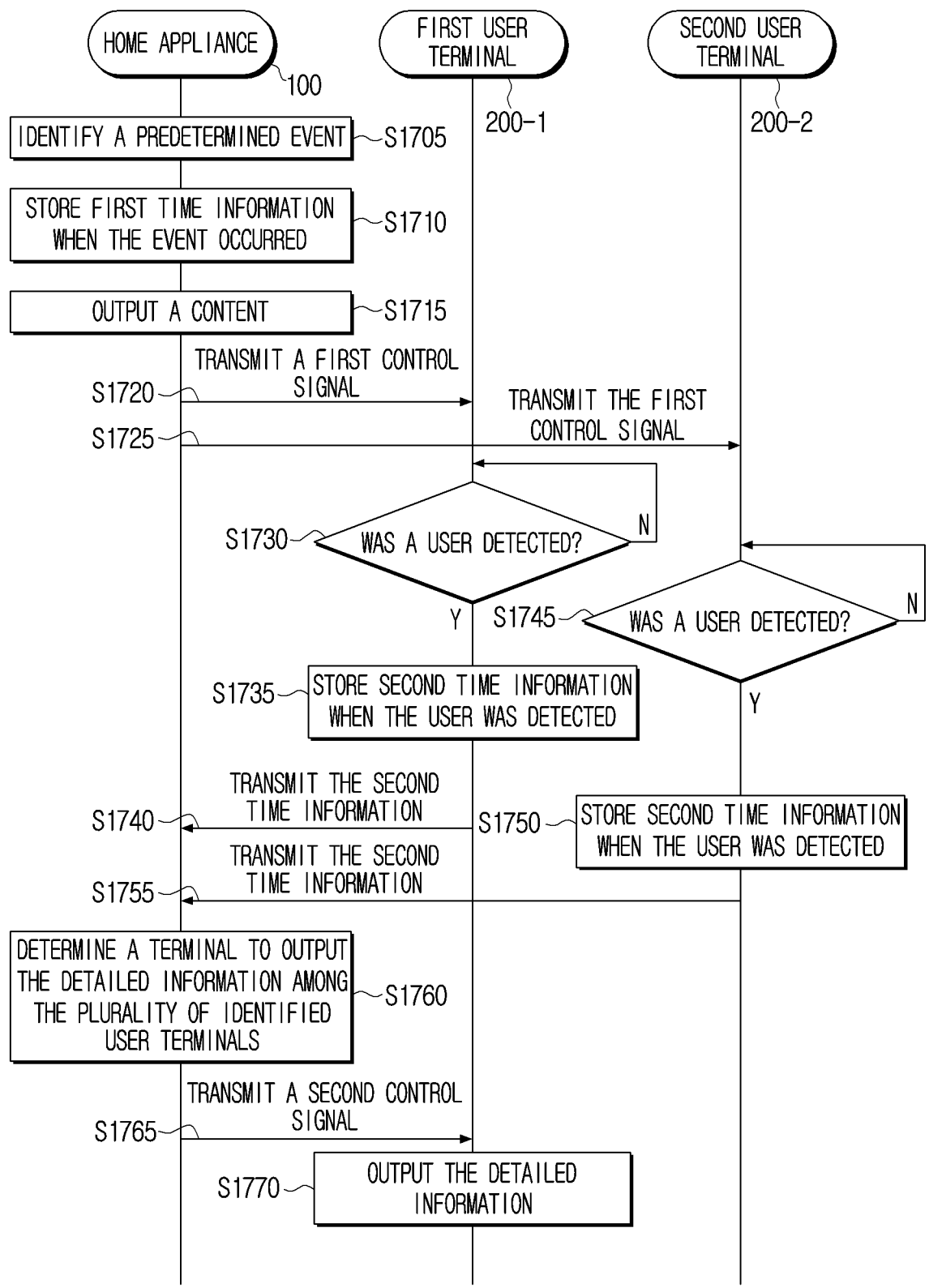
FIG. 17 is a flowchart of a method of outputting detailed information from a system including a home appliance and a plurality of user terminals according to an embodiment.

FIG. 17 is a flowchart of a method of outputting detailed information from a system including a home appliance and a plurality of user terminals according to an embodiment.

Referring to FIG. 17, the operations S1705, S1710, and S1715 may correspond to the operations S305, S310, and S315 in FIG. 3. Accordingly, overlapping explanation will be omitted.

The home appliance 100 may transmit a first control signal to the first user terminal 200-1 after outputting a content in operation S1720. Then, the home appliance 100 may transmit the first control signal to the second user terminal 200-2 after outputting the content in operation S1725. The home appliance 100 may broadcast the first control signal and transmit the signal to a plurality of terminals.

When the first control signal is received from the home appliance 100, the first user terminal 200-1 may identify whether a user is detected in operation S1730. Then, if it is identified that a user is not detected in operation S1730-N, the first user terminal 200-1 may repetitively perform a user detecting operation during a threshold time. If it is identified that a user is detected in operation S1730-Y, the first user terminal 200-1 may store the time when the user was detected as second time information in operation S1735. Then, the first user terminal 200-1 may transmit the second time information to the home appliance 100 in operation S1740.

When the first control signal is received from the home appliance 100, the second user terminal 200-2 may identify whether a user is detected in operation S1745. Then, if it is identified that a user is not detected in operation S1745-N, the second user terminal 200-2 may repetitively perform a user detecting operation during a threshold time. If it is identified that a user is detected in operation S1745-Y, the second user terminal 200-2 may store the time when the user was detected as the second time information in operation S1750. Then, the second user terminal 200-2 may transmit the second time information to the home appliance 100 in operation S1755.

Then, the home appliance 100 may determine to provide detailed information to one terminal among the plurality of identified user terminals 200-1, 200-2 based on the respective second time information received from the first user terminal 200-1 and the second user terminal 200-2 in operation S1760.

It may be assumed that the home appliance 100 determined to output the detailed information from the first user terminal 200-1. The home appliance 100 may transmit a second control signal to the first user terminal 200-1 in operation S1765. Then, when the second control signal is received from the home appliance 100, the first user terminal 200-1 may output the detailed information in operation S1770.

Figure 18:
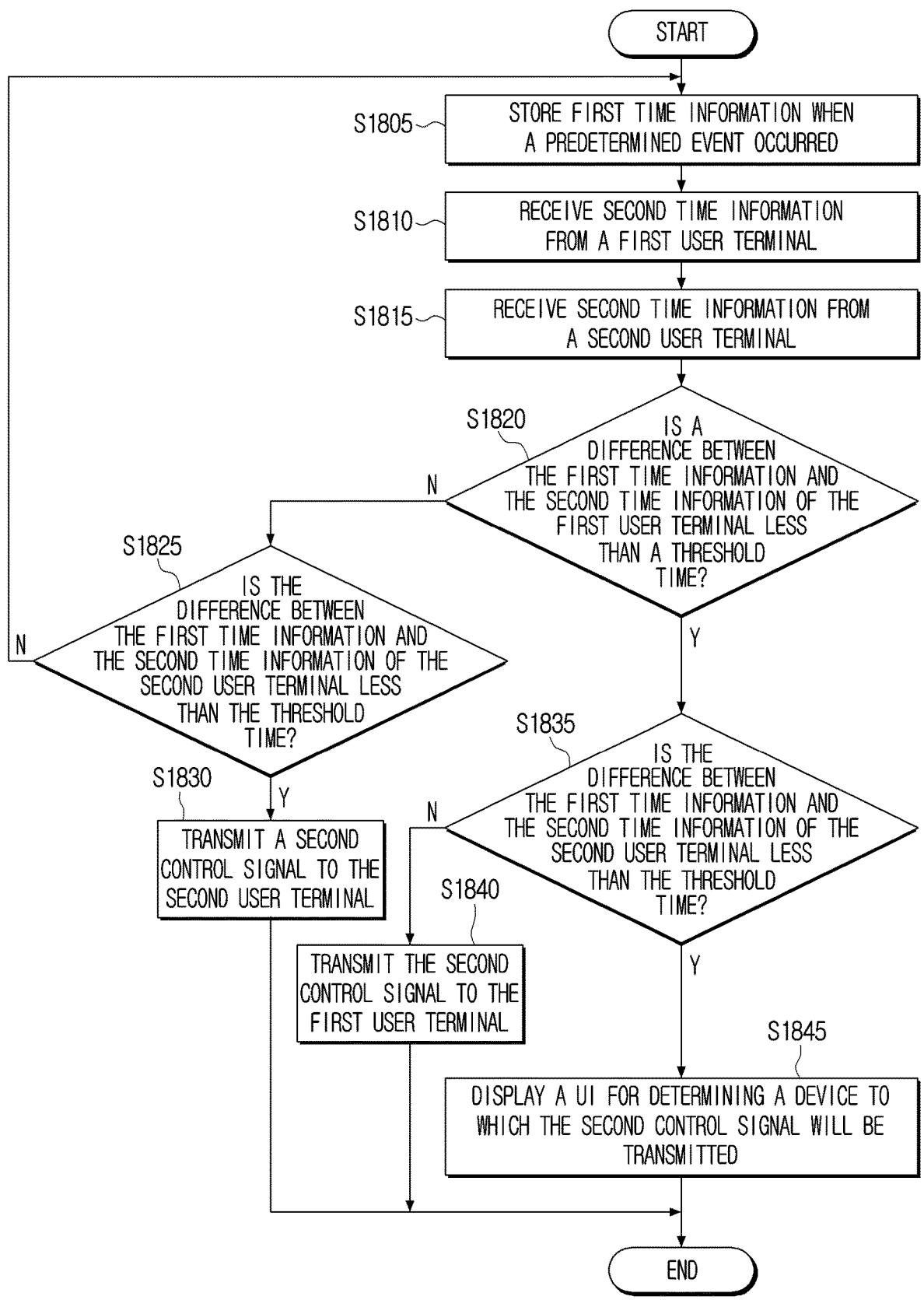
FIG. 18 is a flowchart of a method of determining a device to output detailed information in a system including a home appliance and a plurality of user terminals according to an embodiment.

FIG. 18 is a flowchart of a method of determining a device to output detailed information in a system including a home appliance and a plurality of user terminals according to an embodiment.

Referring to FIG. 18, the home appliance 100 may store the time when a predetermined event will occur as first time information in operation S1805. The home appliance 100 may receive second time information from the first user terminal 200-1 in operation S1810. Then, the home appliance 100 may receive the second time information from the second user terminal 200-2 in operation S1815. The second time information in the operations S1810 and S1815 may refer to time information identified in each user terminal, and may not be the same time information. For example, the second time information received from the first user terminal may be 3:10:10 p.m., and the second time information received from the second user terminal may be 3:10:15 p.m.

The home appliance 100 may identify whether a difference between the first time information and the second time information of the first user terminal 200-1 is less than a threshold time in operation S1820. If the difference between the first time information and the second time information of the first user terminal 200-1 is equal to or greater than the threshold time in operation S1820-N, the home appliance 100 may identify whether a difference between the first time information and the second time information of the second user terminal 200-2 is less than the threshold time in operation S1825.

If the difference between the first time information and the second time information of the second user terminal 200-2 is equal to or greater than the threshold time in operation S1825-N, the home appliance 100 may repetitively identify a predetermined event. If the difference between the first time information and the second time information of the second user terminal 200-2 is less than the threshold time in operation S1825-Y, the home appliance 100 may transmit a second control signal to the second user terminal 200-2 in operation S1830. That is, the home appliance 100 may determine to output the detailed information at the second user terminal 200-2.

If the difference between the first time information and the second time information of the first user terminal 200-1 is less than the threshold time in operation S1820-Y, the home appliance 100 may identify whether the difference between the first time information and the second time information of the second user terminal 200-2 is less than the threshold time in operation S1835.

If the difference between the first time information and the second time information of the second user terminal 200-2 is equal to or greater than the threshold time in operation S1835-N, the home appliance 100 may transmit a second control signal to the first user terminal 200-1 in operation S1840. That is, the home appliance 100 may determine to output the detailed information at the first user terminal 200-1.

If the difference between the first time information and the second time information of the second user terminal 200-2 is less than the threshold time in operation S1835-Y, the home appliance 100 may display a UI for determining a device to which the second control signal will be transmitted in operation S1845. Explanation regarding the UI will be made below in FIG. 19.

According to another implementation example, if the difference between the first time information and the second time information of the second user terminal 200-2 is equal to or greater than the threshold time in operation S1835-N, the home appliance 100 may automatically transmit the second control signal to all of the plurality of terminals. Then, the first user terminal 200-1 and the second user terminal 200-2 may output the detailed information.

Figure 19:
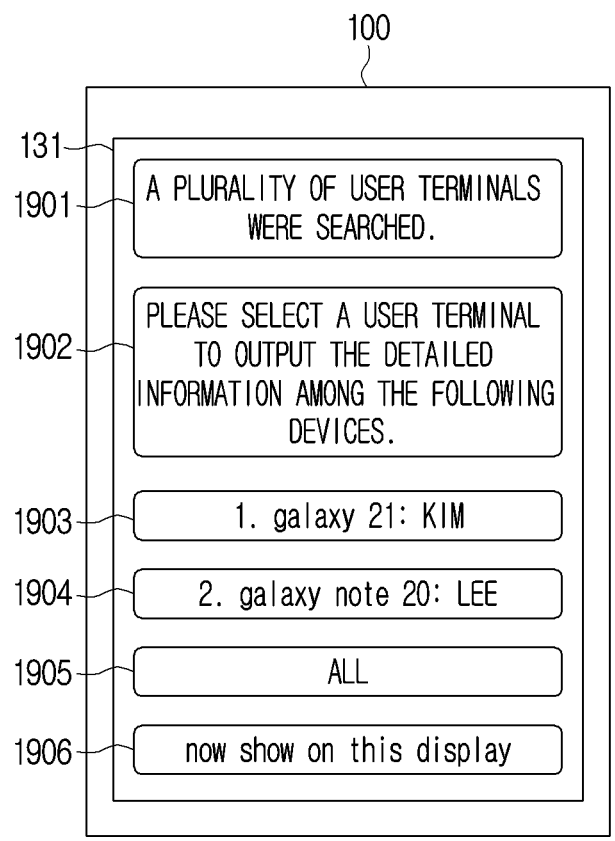
FIG. 19 is a diagram illustrating a UI for determining a device to output detailed information in a system including a home appliance and a plurality of user terminals according to an embodiment.

FIG. 19 is a diagram illustrating a UI for determining a device to output detailed information in a system including a home appliance and a plurality of user terminals according to an embodiment.

Referring to FIG. 19, the home appliance 100 may display the UI in the operation S1845 in FIG. 18 on the display 131. The UI may include at least one UI among a UI 1901 including a notification message notifying that a plurality of user terminals were searched, a UI 1902 guiding to select a user terminal to output detailed information among the plurality of devices, and UIs 1903, 1904, 1905, 1906 corresponding to the plurality of devices. The UIs corresponding to the plurality of devices may include at least one of the UIs 1903, 1904 corresponding to each user terminal, the UI 1905 for selecting all user terminals, or the UI 1906 for displaying detailed information on the home appliance 100 but not a user terminal.

FIG. 20 is a flowchart of a controlling method of a home appliance according to an embodiment.

Referring to FIG. 20, a controlling method of a home appliance storing a content according to an embodiment of the disclosure includes the steps of, based on identifying a predetermined event, outputting the stored content and storing first time information corresponding to the occurrence time of the predetermined event (operation S2005), transmitting a first control signal requesting second time information corresponding to a time when a user was detected at a user terminal to the user terminal (operation S2010), receiving the second time information from the user terminal (operation S2015), and based on a difference between the first time information and the second time information being less than a threshold time, transmitting a second control signal for providing information corresponding to the content to the user terminal (operation S2020).

The predetermined event may include at least one of an event where the home appliance is manipulated by the user, an event where the user is detected, or an event where a predetermined time arrives, and the second time information may include at least one of time information corresponding to a time when a manipulation of the user terminal was detected, time information corresponding to a time when a movement of the user terminal was detected, or time information corresponding to a time when the user was detected at the user terminal.

In the operation S2010 of transmitting the first control signal, the first control signal may be broadcasted, and in the step of receiving the second time information, the second time information corresponding to the first control signal may be received from the user terminal.

In the operation S2010 of transmitting the first control signal, the first control signal may be broadcasted by a BLE method.

The controlling method may further include the steps of, based on identifying the predetermined event, displaying a first UI for guiding transmission of the first control signal, and based on receiving a first user input through the displayed first UI, transmitting the first control signal to the user terminal.

The controlling method may further include the steps of, based on the difference between the first time information and the second time information being less than the threshold time, displaying a second UI for guiding transmission of the second control signal, and based on receiving a second user input through the displayed second UI, transmitting the second control signal to the user terminal.

The second control signal may include at least one of the detailed information, a control command for providing the detailed information, or information on an application for providing the detailed information, and the detailed information may include a URL address related to the content.

The control command for providing the detailed information may include at least one of a control command for displaying the detailed information on a display of the user terminal, a control command for displaying a notification message for providing the detailed information on the display of the user terminal, or a control command for outputting the detailed information through a speaker of the user terminal.

The controlling method may further include the steps of, based on the difference between the first time information and the second time information being equal to or greater than the threshold time, re-transmitting the first control signal for re-requesting the second time information corresponding to the time when the user was detected at the user terminal to the user terminal, and outputting a third UI for guiding a manipulation of the user terminal.

The controlling method may further include the steps of, based on the difference between the first time information and the second time information being equal to or greater than the threshold time, identifying whether the detailed information can be output through the outputter of the home appliance, and based on identifying that the detailed information can be output through the outputter, outputting the detailed information, and based on identifying that the detailed information cannot be output through the outputter, outputting a notification message notifying that the detailed information cannot be output.

The controlling method of a home appliance as in FIG. 20 may be executed in a home appliance having a configuration as in FIG. 1 or FIG. 2, and it may also be executed on home appliances having other configurations.

Methods according to the aforementioned various embodiments of the disclosure may be implemented in forms of applications that can be installed on conventional home appliances.

Also, methods according to the aforementioned various embodiments of the disclosure may be implemented just by software upgrade, or hardware upgrade of conventional home appliances.

In addition, the aforementioned various embodiments of the disclosure may also be performed through an embedded server provided on a home appliance, or an external server of at least one of a home appliance or a display device.

According to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include a home appliance according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. The term 'non-transitory' may mean that a storage medium does not include signals, and is tangible, but does not indicate whether data is stored in the storage medium semi-permanently or temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g.: a module or a program) according to the aforementioned various embodiments may include a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An appliance, comprising:
a memory storing content;
a communication interface;
an outputter; and
a processor configured to:
based on identifying a predetermined event, control the outputter to output the content stored in the memory, and store first time information corresponding to an occurrence time of the predetermined event in the memory,
transmit, to a user terminal through the communication interface, a first control signal requesting second time information corresponding to a time when a user was detected at the user terminal,
receive the second time information from the user terminal, and
based on a difference between the first time information and the second time information being less than a threshold time, control the communication interface to transmit a second control signal that provides information corresponding to the content to the user terminal.

2. The appliance of claim 1, wherein the predetermined event comprises at least one of an event where the appliance is manipulated by the user, an event where the user is detected, or an event where a predetermined time occurs, and
wherein the second time information comprises at least one of time information corresponding to a time when a manipulation of the user terminal was detected, time information corresponding to a time when a movement of the user terminal was detected, or time information corresponding to a time when the user was detected at the user terminal.

3. The appliance of claim 1, wherein the processor is further configured to:
control the communication interface to broadcast the first control signal, and
receive the second time information corresponding to the first control signal from the user terminal through the communication interface.

4. The appliance of claim 3, wherein the processor is further configured to control the communication interface such that the first control signal is broadcasted by a Bluetooth Low Energy (BLE) method.

5. The appliance of claim 1, wherein the outputter comprises a display, and
wherein the processor is further configured to:
based on identifying the predetermined event, control the display to display a first user interface (UI) that guides transmission of the first control signal, and
based on receiving a first user input through the displayed first UI, control the communication interface to transmit the first control signal to the user terminal.

6. The appliance of claim 1, wherein the outputter comprises a display, and
wherein the processor is further configured to:
based on the difference between the first time information and the second time information being less than the threshold time, control the display to display a second user interface (UI) that guides transmission of the second control signal, and based on receiving a second user input through the displayed second UI, control the communication interface to transmit the second control signal to the user terminal.

7. The appliance of claim 1, wherein the second control signal comprises at least one of the information corresponding to the content, a control command for providing the information corresponding to the content, or information on an application for providing the information corresponding to the content, and
wherein the information corresponding to the content comprises a uniform resource locator (URL) address related to the content.

8. The appliance of claim 7, wherein the control command for providing the information corresponding to the content comprises at least one of a control command for displaying the information corresponding to the content on a display of the user terminal, a control command for displaying a notification message for providing the information corresponding to the content on the display of the user terminal, or a control command for outputting the information corresponding to the content through a speaker of the user terminal.

9. The appliance of claim 1, wherein the processor is further configured to:
based on the difference between the first time information and the second time information being equal to or greater than the threshold time, re-transmit the first control signal for re-requesting the second time information corresponding to the time when the user was detected at the user terminal to the user terminal through the communication interface, and
output a third user interface (UI) that guides a manipulation of the user terminal through the outputter.

10. The appliance of claim 1, wherein the processor is further configured to:
based on the difference between the first time information and the second time information being equal to or greater than the threshold time, identify whether the information corresponding to the content can be output through the outputter, and
based on identifying that the information corresponding to the content can be output through the outputter, control the outputter to output the information corresponding to the content, or
based on identifying that the information corresponding to the content cannot be output through the outputter, control the outputter to output a notification message notifying that the information corresponding to the content cannot be output.

11. A controlling method of an appliance storing content, the method comprising:
based on identifying a predetermined event, outputting the stored content, and storing first time information corresponding to an occurrence time of the predetermined event;
transmitting, to a user terminal, a first control signal requesting second time information corresponding to a time when a user was detected at the user terminal;
receiving the second time information from the user terminal; and
based on a difference between the first time information and the second time information being less than a threshold time, transmitting a second control signal for providing information corresponding to the content to the user terminal.

12. The controlling method of claim 11, wherein the predetermined event comprises at least one of an event where the appliance is manipulated by the user, an event where the user is detected, or an event where a predetermined time occurs, and
wherein the second time information comprises at least one of time information corresponding to a time when a manipulation of the user terminal was detected, time information corresponding to a time when a movement of the user terminal was detected, or time information corresponding to a time when the user was detected at the user terminal.

13. The controlling method of claim 11, wherein the transmitting the first control signal comprises broadcasting the first control signal, and
wherein the receiving the second time information comprises receiving the second time information corresponding to the first control signal from the user terminal.

14. The controlling method of claim 13, wherein the transmitting the first control signal comprises broadcasting the first control signal by a Bluetooth Low Energy (BLE) method.

15. The controlling method of claim 11, further comprising:
based on identifying the predetermined event, displaying a first user interface (UI) that guides transmission of the first control signal; and
based on receiving a first user input through the displayed first UI, transmitting the first control signal to the user terminal.

16. The appliance of claim 11, further comprising:
based on the difference between the first time information and the second time information being less than the threshold time, displaying a second user interface (UI) that guides transmission of the second control signal, and
based on receiving a second user input through the displayed second UI, transmitting the second control signal to the user terminal.

17. The appliance of claim 11, wherein the second control signal comprises at least one of the information corresponding to the content, a control command for providing the information corresponding to the content, or information on an application for providing the information corresponding to the content, and
wherein the information corresponding to the content comprises a uniform resource locator (URL) address related to the content.

18. The appliance of claim 17, wherein the control command for providing the information corresponding to the content comprises at least one of a control command for displaying the information corresponding to the content on a display of the user terminal, a control command for displaying a notification message for providing the information corresponding to the content on the display of the user terminal, or a control command for outputting the information corresponding to the content through a speaker of the user terminal.

19. The appliance of claim 11, further comprising:
based on the difference between the first time information and the second time information being equal to or greater than the threshold time, re-transmitting the first control signal for re-requesting the second time information corresponding to the time when the user was detected at the user terminal to the user terminal through the communication interface, and outputting a third user interface (UI) that guides a manipulation of the user terminal through a outputter.

20. The appliance of claim 11, further comprising:

based on the difference between the first time information and the second time information being equal to or greater than the threshold time, identifying whether the information corresponding to the content can be output through a outputter, and based on identifying that the information corresponding to the content can be output through the outputter, outputting the information corresponding to the content, or based on identifying that the information corresponding to the content cannot be output through the outputter, outputting a notification message notifying that the information corresponding to the content cannot be output.

* * * * *